United States Patent
Ogletree et al.

(10) Patent No.: US 11,845,103 B2
(45) Date of Patent: Dec. 19, 2023

(54) LIQUID APPLICATORS AND METHODS OF APPLYING LIQUID TO A SUBSTRATE USING THE SAME

(71) Applicant: The Boeing Company, Chicago, IL (US)

(72) Inventors: Teresa Monique Ogletree, Seattle, WA (US); Zachary Andrew Schwindt, Auburn, WA (US); Colton Massey Smoot, Charleston, SC (US); Kevin Michael Bell, Maple Valley, WA (US); Raymond Henderson, Renton, WA (US); Adam Clark, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/470,998

(22) Filed: Sep. 9, 2021

(65) Prior Publication Data

US 2023/0071339 A1 Mar. 9, 2023

(51) Int. Cl.
*B05C 1/04* (2006.01)
*B05C 11/10* (2006.01)
(Continued)

(52) U.S. Cl.
CPC .............. *B05C 1/04* (2013.01); *B05C 1/14* (2013.01); *B05C 11/1002* (2013.01); *B05D 1/28* (2013.01);
(Continued)

(58) Field of Classification Search
CPC ......... B05C 1/04; B05C 11/1002; B05C 1/14; B05D 1/28; B29C 33/58; B08B 1/008;
(Continued)

(56) References Cited

U.S. PATENT DOCUMENTS 1,919,854 A  7/1933  Masseau
2,098,262 A  11/1937  Temple
(Continued)

FOREIGN PATENT DOCUMENTS

EP  1089832  *  4/2001
EP  1089832 B1  7/2003
WO  WO2013/160288  10/2013

OTHER PUBLICATIONS

WO9959739, "Device For Providing Surface Preparation", Kurcz et al, published Nov. 25, 1999. (Year: 1999).*

(Continued)

*Primary Examiner* — Laura Edwards
(74) *Attorney, Agent, or Firm* — Kolitch Romano Dascenzo Gates LLC

(57) ABSTRACT

Liquid applicators and methods. The liquid applicators include a frame and an applicator head operably coupled to the frame and configured to support a section of an applicator fabric for operable application of a liquid to a substrate. The liquid applicators further include a fabric conveyance system that is operably coupled to the frame and includes a fabric pay-out assembly configured to supply the applicator fabric to the applicator head and a fabric take-up assembly configured to receive the applicator fabric from the applicator head. The liquid applicators further include a liquid delivery system configured to deliver the liquid to the section of the applicator fabric. The methods include delivering the liquid to the section of applicator fabric, engaging the section of applicator fabric with the substrate, and moving the section of the applicator fabric across the substrate to apply the liquid thereto.

20 Claims, 7 Drawing Sheets

(51) Int. Cl.
*B05D 1/28* (2006.01)
*B29C 33/58* (2006.01)
*B05C 1/14* (2006.01)
*B29D 30/30* (2006.01)
*B08B 1/00* (2006.01)

(52) U.S. Cl.
CPC .............. *B08B 1/008* (2013.01); *B29C 33/58* (2013.01); *B29D 30/3021* (2013.01); *B29D 30/3028* (2013.01)

(58) Field of Classification Search
CPC ........... B29D 30/3021; B29D 30/3028; B29D 30/70; Y10T 156/1795
USPC .................. 118/106, 257, 304, 305; 427/429
See application file for complete search history.

(56) References Cited

U.S. PATENT DOCUMENTS

| | | |
|---|---|---|
| 2,258,733 A | 10/1941 | Brackett |
| 2,642,599 A | 6/1953 | Habian |
| 3,104,406 A | 9/1963 | Rhodes |
| 3,196,472 A | 7/1965 | Ventrella |
| 3,439,372 A | 4/1969 | Collier |
| 3,443,270 A | 5/1969 | Smith |
| 3,648,316 A | 3/1972 | Habian et al. |
| 3,775,798 A | 12/1973 | Thornton-Trump |
| 3,777,326 A | 12/1973 | Haley et al. |
| 3,835,498 A | 9/1974 | Arato |
| 4,344,361 A | 8/1982 | MacPhee et al. |
| 4,407,037 A | 10/1983 | Kemble |
| 4,590,578 A | 5/1986 | Barto, Jr. et al. |
| 4,654,087 A | 3/1987 | Fujita et al. |
| 4,668,301 A | 5/1987 | Takigawa |
| 4,757,763 A | 7/1988 | MacPhee et al. |
| 4,826,391 A | 5/1989 | Lawrence et al. |
| 4,875,412 A | 10/1989 | Wright et al. |
| 4,922,821 A | 5/1990 | Nozaka et al. |
| 4,953,252 A | 9/1990 | Akisawa |
| 5,004,156 A | 4/1991 | Montanier |
| 5,076,202 A | 12/1991 | Falls |
| 5,092,012 A | 3/1992 | Rabourn et al. |
| 5,440,986 A | 8/1995 | Braun |
| 5,456,753 A | 10/1995 | Kuribayashi et al. |
| 5,490,646 A | 2/1996 | Shaw et al. |
| 5,515,782 A | 5/1996 | Ebina et al. |
| 5,519,914 A | 5/1996 | Egan |
| 5,537,924 A | 7/1996 | Krause |
| 5,758,577 A | 6/1998 | Ebina |
| 5,797,325 A | 8/1998 | Ebina et al. |
| 5,833,762 A | 11/1998 | Wanner et al. |
| 5,858,111 A | 1/1999 | Marrero |
| 5,868,073 A | 2/1999 | Ebina |
| 5,926,894 A | 7/1999 | Justin |
| 5,959,423 A | 9/1999 | Nakanishi et al. |
| 6,029,934 A | 2/2000 | Foster |
| 6,036,787 A | 3/2000 | Bennett et al. |
| 6,134,734 A | 10/2000 | Marrero |
| 6,247,405 B1 | 6/2001 | Hanke et al. |
| 6,292,976 B1 | 9/2001 | Kurcz et al. |
| 6,308,627 B1 | 10/2001 | König et al. |
| 6,371,027 B1 | 4/2002 | Hanke et al. |
| 6,432,211 B1 | 8/2002 | Schmitt et al. |
| 6,547,187 B2 | 4/2003 | Foster |
| 6,616,102 B1 | 9/2003 | Bond |
| 7,011,025 B2 | 3/2006 | Egan |
| 7,861,347 B2 | 1/2011 | McKeown et al. |
| 8,590,449 B2 | 11/2013 | Egan |
| 8,827,410 B2 | 9/2014 | Sheflin et al. |
| 9,421,757 B2 | 8/2016 | Egan |
| 10,040,101 B2 | 8/2018 | Swanberg et al. |
| 10,575,628 B2 | 3/2020 | Pringle-Iv et al. |
| 2001/0013296 A1 | 8/2001 | Ghisalberti et al. |
| 2003/0075064 A1 | 4/2003 | Schmutz |
| 2003/0089310 A1* | 5/2003 | Wright ................... B05C 1/027 118/264 |
| 2003/0209159 A1 | 11/2003 | Porat et al. |
| 2005/0061182 A1 | 3/2005 | Ebina et al. |
| 2006/0090856 A1 | 5/2006 | Nelson et al. |
| 2006/0263513 A1* | 11/2006 | Romanin .............. C03C 17/002 118/683 |
| 2008/0105150 A1 | 5/2008 | Nadolny et al. |
| 2010/0011980 A1 | 1/2010 | Grandt et al. |
| 2012/0240800 A1 | 9/2012 | Fumagalli et al. |
| 2018/0318885 A1 | 11/2018 | Swanberg et al. |
| 2019/0239632 A1 | 8/2019 | Pringle-Iv et al. |
| 2019/0239633 A1 | 8/2019 | Pringle-Iv et al. |

OTHER PUBLICATIONS

DH Sutherland "Partnership for the Americas," Press Release Regarding Klean Vak Partnership, downloaded from dhsutherland.com/dhsutherland-entering-exclusive-partnership-with-kleanvak, available at least as early as Feb. 4, 2020.

Europe Patent Office, Extended European Search Report for a related Europe Application No. 22194424, dated Feb. 14, 2023.

* cited by examiner

US 11,845,103 B2

LIQUID APPLICATORS AND METHODS OF APPLYING LIQUID TO A SUBSTRATE USING THE SAME

FIELD

The present disclosure relates to liquid applicators and methods of applying liquid to a substrate.

BACKGROUND

The application of a liquid across a substrate is an essential process in many industrial applications including the manufacture, maintenance, and upkeep of structures and components. As an example, during the manufacture of composite parts, a liquid mold release agent typically is applied across the surface of a mold or lay-up mandrel before a composite part is formed thereon. After the composite part is cured and removed from the mold, the mold typically is cleaned with a solvent or cleaning solution to remove the liquid mold-release agent and any remnants from forming the composite part before a new coating of the liquid mold release agent is applied to the mold for forming another composite part. In this example, and in many other industrial applications, it is often important for the liquid to be applied in a uniform or precise manner such that the liquid-treated surface is provided with a consistent finish.

In the past, this process often is carried out manually, with an operator using a cloth or fabric to apply and wipe the liquid across the substrate. Among other drawbacks, manual application can suffer from inconsistency and present ergonomic restrictions particularly with large surface areas. Additionally, many conventional processes spray, jet, or shower the liquid during the application, which can facilitate volatilization of the liquid and thereby place additional design requirements on the system to manage the volatilized liquid load. Thus, a need exists for improved methods and devices for applying liquid to a substrate, which may enhance the uniformity of the liquid application and/or reduce volatilization of the liquid during the application process.

SUMMARY

Liquid applicators and methods of applying a liquid to a substrate are disclosed herein. The liquid applicators include a frame and an applicator head operably coupled to the frame and configured to support a section of an applicator fabric for operable application of the liquid to the substrate. The liquid applicators further include a fabric conveyance system operably coupled to the frame and configured to selectively move the applicator fabric across the applicator head. The fabric conveyance system includes a fabric pay-out assembly configured to supply the applicator fabric to the applicator head and a fabric take-up assembly configured to receive the applicator fabric from the applicator head. The liquid applicators further include a liquid delivery system configured to deliver the liquid to the section of the applicator fabric. In some examples, the fabric pay-out assembly is configured to supply the applicator fabric from a supply spool, and the liquid applicator further includes a radius detector configured to detect a radius of the supply spool, a pay-out torque adjuster configured to apply a pay-out torque to the supply spool, and a controller configured to selectively vary the pay-out torque applied by the pay-out torque adjuster based on a pay-out radius. In some examples, the liquid delivery system includes a liquid outlet positioned to supply the liquid directly to the section of the applicator fabric, a liquid reservoir configured to contain the liquid, and a pump configured to selectively draw the liquid from the liquid reservoir and flow the liquid through the liquid outlet at an ambient pressure.

The methods include delivering the liquid to the section of applicator fabric, engaging the section of applicator fabric with the substrate, and moving the section of the applicator fabric across the substrate to apply the liquid thereto. In some examples, the methods further include detecting a pay-out radius of the supply spool and adjusting the pay-out torque applied to the supply spool based on the pay-out radius. Additionally or alternatively, in some examples, the methods further include drawing the liquid from the liquid reservoir, and flowing the liquid through the liquid outlet to the section of applicator fabric at an ambient pressure.

DESCRIPTION

Figure 1:
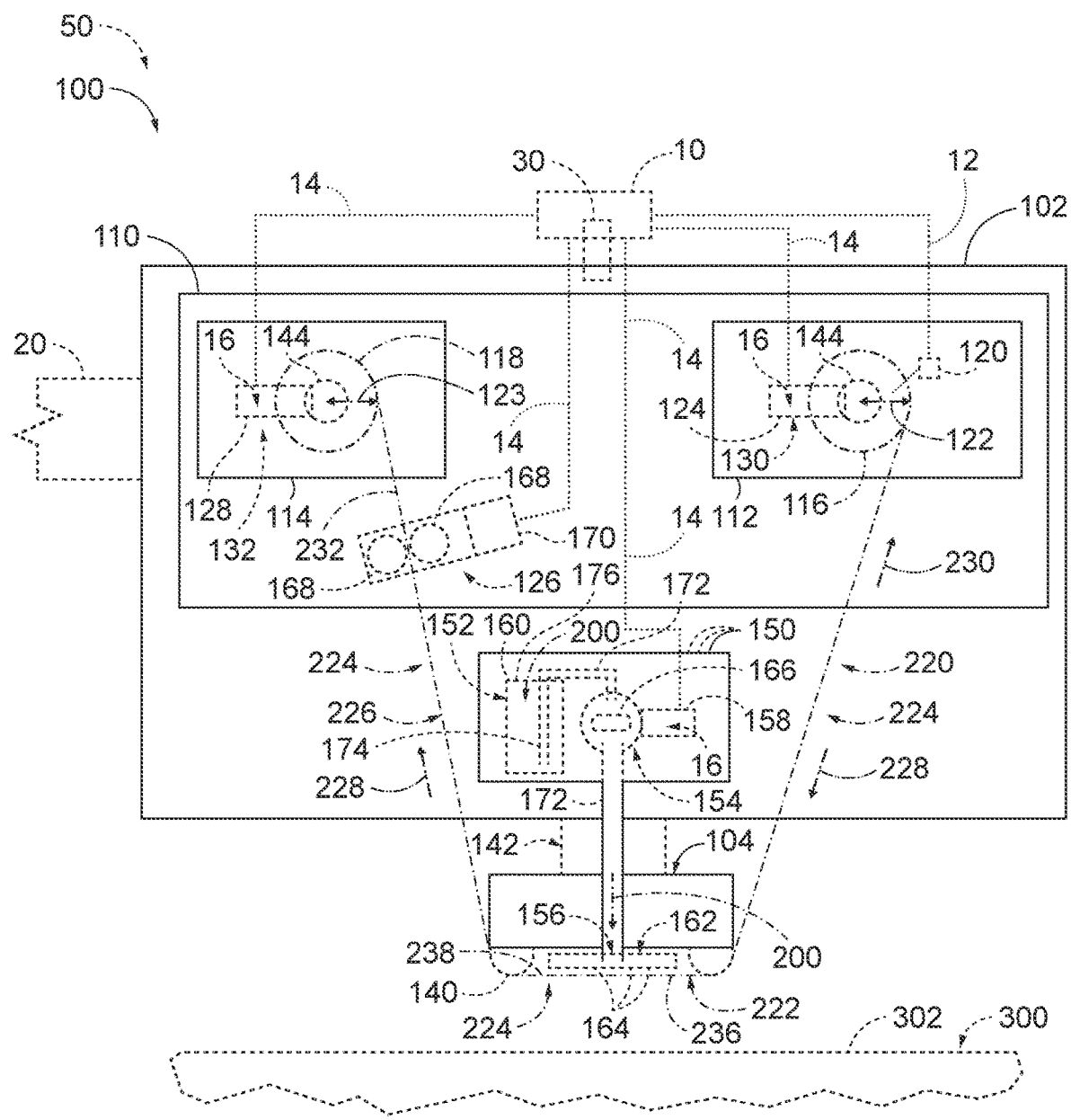
FIG. 1 is a schematic representation of liquid applicators according to the present disclosure.

FIGS. 1-7 provide examples of liquid applicators 100, automated liquid applicator assemblies 50 including liquid applicators 100, and methods 500 for applying liquid to a substrate according to the present disclosure. Elements that serve a similar, or at least substantially similar, purpose are labeled with like numbers in each of FIGS. 1-7 and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. In FIG. 1, dot-dash lines may be utilized to indicate materials utilized by, but not necessarily included in, liquid applicator 100, including liquid 200 and applicator fabric 220. Additionally, electrical and/or information communication connections may be indicated in dotted lines in FIG. 1.

FIG. 1 is a schematic representation showing examples of liquid applicators 100 according to the present disclosure. As shown in FIG. 1, liquid applicators 100 are configured to apply a liquid 200 to a substrate 300 via an applicator fabric 220. Liquid applicators 100 include a frame 102 configured to support the various components of liquid applicator 100 in relation to one another, and an applicator head 104 operably coupled to the frame 102. Applicator head 104 is configured to support a section 222 of the applicator fabric 220 for operable application of liquid 200 to substrate 300. Liquid applicators 100 also include a fabric conveyance system 110 operably coupled to frame 102 and configured to selectively move applicator fabric 220 across applicator head 104. More specifically, fabric conveyance system 110 includes a fabric pay-out assembly 112 configured to supply the applicator fabric 220 to applicator head 104 and a fabric take-up assembly 114 configured to receive applicator fabric 220 from applicator head 104. Liquid applicators 100 further include a liquid delivery system 150 configured to selectively deliver the liquid 200 to the section 222 of the applicator fabric 220.

In some examples, liquid applicators 100 further include a controller 10 configured to actuate various components of liquid applicator 100 as discussed in more detail herein. In some examples, controller 10 is configured to receive sensor signals from one or more sensors included in liquid applicators 100 and actuate one or more components of liquid applicator 100 based upon the sensor signals. More specifically, as shown in FIG. 1, when included, controller 10 is in communication, such as digital and/or electrical communication with various actuated components of liquid applicator 100, and is configured to selectively issue command signals 14 to the various actuated components to control operation thereof. For brevity, in some instances, command signals 14 and sensor signals are generally, or collectively, referred to herein as data signals.

In some examples, liquid applicators 100 are included in, or define a portion of, an automated liquid applicator assembly 50 that is configured to selectively apply liquid 200 to substrate 300. In some such examples, liquid applicator 100 is configured as an end effector of automated liquid applicator assembly 50. More specifically, automated liquid applicator assembly 50 may include a robotic arm 20 that is configured to move liquid applicator 100 relative to substrate 300, and liquid applicator 100 is, or is configured to be, operably coupled to robotic arm 20 to form an end effector thereof. For examples in which liquid applicator 100 is included in automated liquid applicator assembly 50, controller 10 may be included in automated liquid applicator assembly 50, and optionally remote from frame 102 and the components of liquid applicator 100 operatively coupled thereto. In some examples, controller 10 also is configured to operate robotic arm 20 such as to move, orient, and position liquid applicator 100 relative to substrate 300 as discussed herein. Additionally or alternatively, in some examples, automated liquid applicator assembly 50 includes a plurality of controllers 10, at least one of which being configured to operate the components of liquid applicator 100 and another controller 10 being configured to operate robotic arm 20.

Liquid applicators 100 may be described as being configured to wet, saturate, load, soak, impregnate, and/or otherwise dose section 222 of applicator fabric 220 with liquid 200 and apply liquid 200 to substrate 300 by engaging the liquid 200 wetted, saturated, loaded, soaked, and/or impregnated section 222 of applicator fabric 220 with substrate 300. In some examples, liquid applicators 100 are configured to apply liquid 200 across a region or area of substrate 300 by engaging the wetted section 222 of applicator fabric 220 with substrate 300 while section 222 is moved or wiped across the area or region of substrate 300. In the present disclosure, section 222 of applicator fabric 220 may be referred to as wetted section 222 or liquid-wetted section 222 when section 222 is wetted, saturated, loaded, soaked, impregnated, and/or otherwise dosed with liquid 200.

As discussed herein, section 222 of applicator fabric 220 may include the portion of applicator fabric 220 that is directly supported by applicator head 104. As shown in FIG. 1, liquid applicators 100 are configured to support a deployed portion 224 of applicator fabric 220 that extends from fabric pay-out assembly 112, across applicator head 104, and to fabric take-up assembly 114. In some examples, fabric conveyance system 110 is configured to tension applicator fabric 220 across applicator head 104 such that applicator head 104 defines the shape, geometry, and/or orientation of section 222. In some examples, applicator head 104 includes a fabric-contacting region that is configured to directly contact and support section 222 of applicator fabric 220. In some such examples, applicator head 104 includes a pair of fabric-contacting members 140 each being configured to directly contact and support section 222 of applicator fabric 220.

In some examples, fabric-contacting members 140 are positioned to extend at least substantially parallel to and laterally spaced apart from one another such that fabric conveyance system 110 tensions section 222 of applicator fabric 220 to extend across and between the pair of fabric-contacting members 140. In this way, fabric-contacting members 140 may support section 222 of applicator fabric 220 such that section 222 forms a sheet for operable application of liquid 200 to substrate 300. In some examples, each fabric-contacting member 140 is oriented such that a length of the fabric-contacting member 140 is parallel to a width of the section 222 of applicator fabric 220. As defined herein, the width of section 222 refers to the dimension of applicator fabric 220 that is transverse to the length of deployed portion 224. More specific examples of suitable fabric-contacting members 140 include contact rollers, elongate bladders, and/or elongate pneumatic bags. For some examples in which fabric-contacting members 140 include contact rollers, the contact rollers are oriented such that the axis of rotation of each contact roller is at least substantially aligned with the width of section 222.

Applicator head 104 is configured to engage section 222 of applicator fabric 220 with substrate 300. As shown in FIG. 1, in some examples, liquid applicators 100 include a pressure modulator 142 that operably couples applicator head 104 to frame 102 and positions applicator head 104 relative to frame 102. Pressure modulator 142 additionally or alternatively may be referred to as a counter balance and/or a force controller. When included, pressure modulator 142 is configured to maintain a pressure between applicator head 104 and substrate 300 within a target pressure range when applicator head 104 is operably engaged with substrate 300. For example, pressure modulator 142 may be configured to permit applicator head 104 to deflect relative to frame 102 when applicator head 104 is moved along a substrate 300 that is non-planar and/or that includes topographical variations while maintaining the pressure therebetween within the target pressure range. In more specific examples, pressure modulator 142 includes a pneumatic piston assembly that is configured to modulate recoil force between applicator head 104 and frame 102.

Liquid applicators 100 are configured to apply liquid 200 to any suitable substrate 300. As examples, substrate 300 may include a plastic material, a polymeric material, a ceramic, a composite material, such as a carbon fiber reinforced polymer, a partially constructed composite material, a metallic material, such as aluminum or an aluminum alloy, and/or combinations thereof. In some examples, substrate 300 is defined by, or included in a component, and/or an aerospace component. Examples of suitable aerospace components include a fuselage, a wing, a wing section, a winglet, a horizontal stabilizer, a vertical stabilizer, as well as subcomponents thereof and/or partially constructed structures thereof. Additionally or alternatively, in some examples, substrate 300 is included in or defined by a mold and/or mandrel for forming a component. Thus, while FIG. 1 illustrates substrate 300 as defining a surface 302, which is planar, liquid applicator 100 may be configured to apply liquid 200 to surfaces 302, which may be non-planar. Liquid applicators 100 also may be configured to apply liquid to a substrate 300 that is in any suitable orientation relative to the direction of gravity. For example, liquid applicators 100 may be configured to apply liquid 200 to a substrate 300 that is horizontal, vertical, inverted, and/or oriented at any suitable angle therebetween. Liquid applicators 100 also may be configured to apply liquid 200 to a substrate 300 that is curved and/or that defines a surface 302 having a plurality of orientations relative to the direction of gravity.

Liquid applicators 100 may be utilized to apply liquid 200 to substrate 300 for any suitable purpose. In some examples, liquid applicators 100 are configured to clean or remove material, such as surface particulate, from substrate 300. In some examples, substrate 300 is included in or defined by a component that needs to be cleaned prior to cleaning, coating, or otherwise applying a material to substrate 300. In such examples, the material that is to be cleaned or removed from substrate 300 is transferred to section 222 of applicator fabric 220 when section 222 is engaged with, and optionally moved across, substrate 300. In some examples, liquid applicators 100 are configured to apply a thin film of liquid 200 to substrate 300, such that liquid 200 evaporates or volatilizes subsequent to application to substrate 300. In some examples, liquid applicators 100 are configured to apply a low boiling point or volatile liquid to substrate 300. In some examples, liquid 200 is configured to facilitate transfer of the material from substrate 300 to the wetted section 222 of applicator fabric 220, such as by dissolving the material or wicking the material into the wetted section 222.

Additionally or alternatively, in some examples, liquid applicators 100 are configured to apply a liquid 200 to substrate 300 that is configured to remain on substrate 300 permanently or at least within an operational time frame. In a more specific example, liquid applicators 100 may be configured to apply a liquid 200 that is a mold release agent to substrate 300, such as a mold. Additionally or alternatively, in some examples, liquid applicators 100 are configured to apply a liquid 200 to substrate 300, such as a partially constructed component, that binds or otherwise adheres to substrate 300 subsequent to application by liquid applicator 100. In some such examples, liquid 200 includes a paint, a resin, an adhesive, a binder, a curing material, a polymeric material, and/or combinations thereof.

In many of the above applications, it is desirable for liquid applicators 100 to apply a thin, even, uniform, and/or compositionally consistent layer or coating of liquid 200 to substrate 300. With this in mind, liquid applicators 100 may be configured to support or provide section 222 of applicator fabric 220 in a manner that section 222 forms a uniform or consistent interface for applying liquid 200 to substrate 300. Thus, in some examples, fabric conveyance system 110 is configured to move applicator fabric 220 across applicator head 104 between applications of liquid 200 to substrate 300 to replenish or provide applicator head 104 with a new or unsoiled section 222 of applicator fabric 220. In other words, fabric conveyance system 110 is configured to move a soiled section 222 of applicator fabric 220 that has applied liquid 200 to, and/or cleaned, substrate 300 from applicator head 104 and provide an unsoiled or new section 222 of applicator fabric 220 to applicator head 104 between liquid 200 applications. Additionally or alternatively, in some examples, fabric conveyance system 110 is configured to maintain tension in section 222 of applicator fabric 220 and/or restrict applicator fabric 220 from moving relative to applicator head 104 such that section 222 forms an even, uniform, and/or planar interface for applying liquid 200 to substrate 300.

As shown in FIG. 1, in some examples, fabric pay-out assembly 112 is configured to support a supply spool 116 of applicator fabric 220 and deliver applicator fabric 220 from supply spool 116. Similarly, in some examples, fabric take-up assembly 114 is configured to form a take-up spool 118 of the applicator fabric 220 received from applicator head 104 and support the take-up spool 118. In such examples, the deployed portion 224 of applicator fabric 220 extends from supply spool 116 across applicator head 104 and to take-up spool 118. In some examples, fabric pay-out assembly 112 includes a drum 144 for supporting supply spool 116 and/or fabric take-up assembly 114 includes a drum 144 for supporting take-up spool 118.

Stated another way, in some examples, fabric pay-out assembly 112 is configured to move applicator fabric 220 from supply spool 116 to take-up spool 118. In this way, the radius of supply spool 116, which is referred to herein as a pay-out radius 122, decreases as fabric conveyance system 110 moves applicator fabric 220 across applicator head 104. Likewise, the radius of take-up spool 118, which is referred to herein as a take-up radius 123, increases as fabric conveyance system 110 moves applicator fabric 220 across applicator head 104. In some examples, fabric conveyance system 110 is configured to rotate supply spool 116 to deliver applicator fabric 220 therefrom and rotate take-up spool 118 to receive applicator fabric 220 thereon. Thus, as defined herein, pay-out radius 122 extends between the axis about which supply spool 116 rotates and the outermost radial extent of supply spool 116, and take-up radius 123 extends between the axis about which take-up spool 118 rotates and the outermost radial extent of take-up spool 118. When supply spool 116 is supported by a respective drum 144, a portion of pay-out radius 122 is defined by the respective drum 144. Likewise, when take-up spool 118 is supported by drum 144, a portion of take-up radius 123 is defined by the respective drum 144.

In some examples, fabric conveyance system 110 is configured to maintain tension within deployed portion 224 of applicator fabric 220 such that section 222 of applicator fabric 220 is supported for operable application of liquid 200 to substrate 300 and/or such that applicator fabric 220 is moved evenly between supply spool 116 and take-up spool 118. With this in mind, in some examples, liquid applicator 100 is configured to control a torque applied to supply spool 116 and/or a torque applied to take-up spool 118 such that tension within deployed portion 224 of applicator fabric 220, or one or more sections 222 thereof, is maintained within a desired target range.

As shown in FIG. 1, in some examples, fabric conveyance system 110 further includes a radius detector 120 configured to detect pay-out radius 122 of supply spool 116, and a pay-out torque adjuster 124 configured to apply a pay-out torque to supply spool 116. As mentioned, in some examples, liquid applicators 100 include controller 10. In some such examples, controller 10 is in communication with radius detector 120 and pay-out torque adjuster 124. In some examples, controller 10 is configured to receive, from radius detector 120, a detector signal 12 respective to (i.e., includes data corresponding to) pay-out radius 122 and to actuate pay-out torque adjuster 124 based on the detector signal 12 to maintain a section tension in section 222 of applicator fabric 220 within a target section tension range.

Fabric conveyance system 110 may be described as being configured to selectively move applicator fabric 220 in a downstream direction 228 that extends along deployed portion 224 of applicator fabric 220 from supply spool 116 towards take-up spool 118. In some examples, pay-out torque adjuster 124 is configured to apply the pay-out torque to supply spool 116 in a direction that applies an upstream force to the deployed portion 224 of applicator fabric 220, in which the upstream force is in an upstream direction 230 that is opposed to downstream direction 228. Stated differently, in some examples, controller 10 is configured to actuate pay-out torque adjuster 124 to apply tension to deployed portion 224 of applicator fabric 220 in upstream direction 230.

Radius detector 120 may include any suitable sensor for detecting pay-out radius 122 of supply spool 116. Examples of suitable radius detectors 120 include a caliper, a displacement sensor, a sonic sensor, an optical length sensor, a laser sensor, and/or a laser triangulation sensor. In some examples, controller 10 is configured to selectively vary the pay-out torque applied to supply spool 116 of applicator fabric 220 by pay-out torque adjuster 124 in proportion to, or linearly with, pay-out radius 122. Stated differently, in such examples, controller 10 is configured to selectively decrease the pay-out torque applied to supply spool 116 as pay-out radius 122 decreases. For some examples in which radius detector 120 comprises a laser sensor, controller 10 utilizes equations (1)-(4) for determining a magnitude of pay-out torque to apply supply spool 116 based on a raw laser reading or detector signal 12 received from radius detector 120:

$$\tau = R_p \times T \quad (1)$$

$$R_P = (m*x) + b \quad (2)$$

where $$b = R - (m*L) \quad (3)$$

$$m = \frac{R-r}{L-l} \text{ and} \quad (4)$$

Where $\tau$ is pay-out torque, X is the cross product, and T is the tension applied to deployed portion 224 applicator fabric 220, $R_P$ is the pay-out radius 122, r is the radius of an empty supply spool 116, which is the radius of drum 144 when supply spool 116 is supported on drum 144, R is the maximum or full pay-out radius 122, L is the raw laser signal at R, l is the raw laser signal at r, and x is the actual laser reading. Thus, in such examples, there is a linear relationship between the change in laser output and the pay-out torque to be applied to supply spool 116 to maintain the section tension in section 222 of applicator fabric 220 within the target section tension range.

Generally speaking, the target section tension range corresponds to a magnitude of torque that is adequate to render section 222 with the desired application interface (e.g., a planar surface) and/or restrict applicator fabric 220 from moving relative to applicator head 104 without damaging applicator fabric 220 and/or one or more components of liquid applicator 100. Illustrative non-exclusive examples of the pay-out torque applied by pay-out torque adjuster 124 include at least 0.1 Newton-meters (Nm), at least 0.15 Nm, at least 0.2 Nm, at least 0.3 Nm, at least 0.35 Nm, at least 0.4 Nm, at most 0.3 Nm, at most 0.35 Nm, at most 0.4 Nm, at most 0.45 Nm, at most 0.5 Nm, at most 0.55 Nm, at most 0.6 Nm, and/or at most 1 Nm.

As shown in FIG. 1, in some examples, fabric pay-out assembly 112 includes a pay-out motor 130 that is, or includes, pay-out torque adjuster 124. Examples of suitable pay-out motors 130 include an electric motor, a rotary motor, a servomotor, and/or a smart motor.

With continued reference to FIG. 1, deployed portion 224 of applicator fabric 220 includes a take-up portion 226 that extends between applicator head 104 and take-up spool 118. In some examples, fabric conveyance system 110 further includes a pinch roller assembly 126 configured to engage take-up portion 226 of applicator fabric 220 and selectively convey take-up portion 226 towards take-up spool 118. In other words, when included, pinch roller assembly 126 is configured to selectively convey applicator fabric 220 in downstream direction 228. In some examples, pinch roller assembly 126 is configured to provide the motive force for moving applicator fabric 220 across applicator head 104 and/or for rotating supply spool 116 to provide applicator fabric 220 to applicator head 104.

In some examples, controller 10 is in communication with pinch roller assembly 126 and configured to actuate pinch roller assembly 126 to apply motive force to applicator fabric 220 and/or to selectively apply tension to applicator fabric 220. As mentioned, in some examples, fabric conveyance system 110 is configured to restrict movement of applicator fabric 220 relative to applicator head 104 during application of liquid 200 to substrate 300 via section 222 of applicator fabric 220. In some such examples, controller 10 is configured to actuate pinch roller assembly 126 to selectively retain take-up portion 226 of applicator fabric 220 against movement in upstream direction 230 when pay-out torque adjuster 124 applies the upstream force to deployed portion 224 of applicator fabric 220. Stated differently, in some examples, controller 10 actuates pinch roller assembly 126 to apply tension to take-up portion 226 in upstream direction 230 that balances the tension applied to deployed portion 224 of applicator fabric 220 by pay-out torque adjuster 124, such that deployed portion 224 of applicator fabric 220 is restricted from movement relative to applicator head 104. Thus, when included, pinch roller assembly 126 is configured to maintain section tension in section 222 of applicator fabric 220 within the target section tension range together with pay-out torque adjuster 124.

As shown in FIG. 1, in some examples, pinch roller assembly 126 includes a pair of rollers 168 that are configured to engage with opposing sides of take-up portion 226 of applicator fabric 220 and pinch take-up portion 226 therebetween. In some examples, pinch roller assembly 126 further includes a pinch roller assembly motor 170 in communication with controller 10 and configured to selectively rotate rollers 168, such as responsive to command signals 14 received from controller 10. Examples of suitable pinch roller assembly motors 170 include an electric motor, a rotary motor, a servomotor, and/or a smart motor.

With continued reference to FIG. 1, when fabric conveyance system 110 includes pinch roller assembly 126, deployed portion 224 of applicator fabric 220 includes a downstream take-up portion 232 that extends between pinch roller assembly 126 and take-up spool 118. In some examples, fabric conveyance system 110 further includes a take-up torque adjuster 128 configured to apply a take-up torque to take-up spool 118 of applicator fabric 220. When included, take-up torque adjuster 128 is in communication with and configured to receive command signals 14 from controller 10. More specifically, in some examples, controller 10 is configured to actuate take-up torque adjuster 128 based on detector signals 12 from radius detector 120 to maintain a take-up tension in downstream take-up portion 232 of applicator fabric 220 within a target take-up tension range. In other words, controller 10 may be configured to vary the take-up torque applied by take-up torque adjuster 128 based on pay-out radius 122, which decreases as take-up radius 123 increases. Thus, in some examples, controller 10 is configured to actuate take-up torque adjuster 128 to increase the take-up torque applied to take-up spool 118 as pay-out radius 122 of supply spool 116 decreases and/or as take-up radius 123 increases.

The target take-up tension range may be the same as, or different from, the target section tension range. In some examples, the target take-up tension range is less than the target section tension range. In some examples, take-up torque adjuster 128 is configured to apply the take-up torque to take-up spool 118 in a direction that applies the downstream force to the downstream take-up portion 232 of the applicator fabric 220. In some examples, take-up torque adjuster 128 is configured to apply the take-up torque to the take-up spool in a magnitude that maintains the take-up tension within the take-up tension range without causing the applicator fabric 220 to be pulled or slip through pinch rollers 168. In other words, the downstream force applied to the downstream take-up portion 232 of the applicator fabric 220 may not move the applicator fabric 220 through rollers 168 of pinch roller assembly 126 when rollers 168 are engaged with, or retaining, the take-up portion 226 of applicator fabric 220. Stated yet another way, the downstream force applied to the downstream take-up portion 232 of applicator fabric 220 may only apply the take-up tension to the downstream take-up portion 232 without increasing the section tension in the section 222 of the applicator fabric 220. In some examples, fabric take-up assembly 114 includes a take-up motor 132 that is, or includes, take-up torque adjuster 128. When included, take-up motor 132 also is configured to selectively rotate take-up spool 118, such as responsive to control signals from controller 10, to receive applicator fabric 220 onto take-up spool 118. Examples of suitable take-up motors 132 include an electric motor, a rotary motor, a servomotor, and/or a smart motor.

In some examples, pinch roller assembly 126 is configured to selectively move a preselected length of applicator fabric 220 across applicator head 104 in downstream direction 228 during a fabric regeneration cycle. In some such examples, pinch roller assembly 126 also is configured to draw the preselected length of applicator fabric from supply spool 116 of applicator fabric. In some examples, controller 10 is configured to actuate take-up motor 132 to rotate take-up spool 118 and receive the preselected length of applicator fabric 220 during the applicator fabric regeneration cycle. In some examples, the preselected length of applicator fabric 220 is a threshold fraction of the length of section 222 of application fabric 220, with examples of the threshold fraction including at least 90%, at least 100%, at least 120%, at least 130%, at least 150%, at most 100%, at most 120%, at most 130%, at most 150%, and/or at most 200%.

Fabric conveyance system 110 also may be configured to maintain section tension in section 222 of applicator fabric 220 within the target section tension range while fabric conveyance system 110 moves applicator fabric 220 across applicator head 104 during an applicator fabric regeneration cycle. In such examples, pay-out torque adjuster 124 and/or pay-out motor 130 are configured to permit rotation of supply spool 116 during the applicator fabric regeneration cycle while applying the pay-out torque to supply spool 116 in a direction that applies the upstream force to deployed portion 224 of applicator fabric 220. Similarly, in some examples, fabric conveyance system 110 is configured to maintain take-up tension in downstream take-up portion 232 of applicator fabric 220 during an applicator fabric regeneration cycle. For example, responsive to command signal(s) 14 from controller, take-up motor 132 may rotate take-up spool 118 to receive applicator fabric 220 at the same linear rate as pinch roller assembly 126 moves applicator fabric 220 towards take-up spool 118 while applying the take-up torque to take-up spool 118 to maintain the take-up tension in the downstream take-up portion 232 of applicator fabric 220 within the target take-up tension range.

Liquid applicators 100 and/or fabric conveyance system 110 may be configured to handle or utilize any suitable type of applicator fabric 220. In some examples, the particular type of applicator fabric 220 is selected for its compatibility with liquid 200, compatibility with substrate 300, and/or effectiveness for the particular type of liquid application (e.g., cleaning or deposition). Illustrative, non-exclusive examples of suitable applicator fabrics 220 include fabrics composed of one or more of polyester, nylon, wood pulp, rayon, and/or cotton, as well as fabrics sold under the PUREWIPE™, DUPONT SONTARA™, KIMTECH SCOTTPURE™, VERACLEAM, BEMCOT™, AEROTEX™, HERMATEX™, RYMPLECLOTH™, and WESTON™ brands.

As shown in FIG. 1, in some examples, liquid delivery system 150 includes a liquid reservoir 152 configured to contain liquid 200, a liquid outlet 156 positioned to supply liquid 200 directly to section 222 of applicator fabric 220, and a pump 154 in fluid communication with liquid outlet 156 and liquid reservoir 152. Pump 154 is configured to selectively draw liquid 200 from liquid reservoir 152 and selectively flow liquid 200 through liquid outlet 156 at an ambient pressure. As referred to herein, ambient pressure may refer to a pressure that is the same as, or at least substantially the same as, the pressure of the atmosphere surrounding liquid applicator 100. As examples, the ambient pressure may be at least 75%, at least 80%, at least 85%, at least 90%, at least 95%, at least 100%, at most 100%, at most 105%, at most 110%, at most 115%, at most 120%, and/or at most 125% of the pressure of the atmosphere surrounding liquid applicator 100. Thus, stated in slightly different terms, pump 154 is configured to flow liquid 200 through liquid outlet 156 with liquid 200 remaining in, or near, pressure equilibrium with the surrounding atmosphere. In this way, pump 154 may flow liquid 200 through liquid outlet 156 without atomizing, volatilizing, and/or spraying liquid 200.

When included, pump 154 is interconnected with liquid reservoir 152 through at least one corresponding liquid conduit 172 and with liquid outlet 156 through at least one corresponding liquid conduit 172. In some examples, pump 154 is configured to selectively draw a preselected volume of liquid 200 from liquid reservoir 152 and selectively flow the preselected volume of liquid 200 through liquid outlet 156 during a liquid application cycle. In other words, in such examples, pump 154 is configured to selectively initiate and cease the flow of liquid 200 through liquid outlet 156 to deliver the preselected volume of liquid 200 to section 222 of applicator fabric 220 during a liquid delivery cycle. Examples of suitable pumps 154 include a precision volume pump, a peristaltic pump, a rotary peristaltic pump, a positive displacement pump, a diaphragm pump, and a piston pump.

As shown in FIG. 1, in some examples, liquid delivery system 150 comprises a pump motor 158 in communication with controller 10 and configured to selectively actuate pump 154. In some such examples, controller 10 is configured to actuate pump motor 158 such that pump 154 flows the preselected volume of liquid 200 through liquid outlet 156. For examples in which pump 154 is a peristaltic pump or a rotary peristaltic pump, pump 154 includes a rotor 166 that is configured to rotate to draw liquid 200 from liquid reservoir 152 and flow liquid 200 through liquid outlet 156. In some such examples, pump motor 158 is engaged with and configured to selectively rotate rotor 166. In some examples, the volume of liquid 200 that pump 154 draws from liquid reservoir 152 and flows through liquid outlet 156 corresponds to a degree and/or number of rotations of rotor 166. Thus, in some such examples, controller 10 is configured to selectively actuate pump motor 158 to rotate rotor 166 through a preselected degree of rotation corresponding to the preselected volume such that pump 154 flows the preselected volume of liquid 200 through liquid outlet 156. In some examples, controller 10 is configured to selectively regulate the preselected volume of liquid 200 delivered by pump 154 by controlling the degree of rotation that rotor 166 is driven through by pump motor 158. More specific examples of suitable pump motors 158 include an electric motor, a rotary motor, a servomotor, and/or a smart motor.

In some examples, liquid reservoir 152 is configured to contain liquid 200 at ambient or negative pressure. As referred to herein, negative pressure is a pressure that is lower than ambient pressure and/or lower than the pressure of the atmosphere surrounding liquid applicators 100. As shown in FIG. 1, in some examples, liquid reservoir 152 includes a one-way valve 160 that permits air to enter liquid reservoir 152, such as when pump 154 draws liquid 200 therefrom, while restricting air, fluid vapor, liquid vapor, and/or gaseous liquid from escaping through one-way valve 160. In some examples, one-way valve 160 is positioned along liquid reservoir 152 to be above the surface, or waterline, of liquid 200. As further shown in FIG. 1, in some examples, liquid reservoir 152 includes a cap 176 and a sip-tube 174 that extends through cap 176. When included, sip-tube 174 is in fluid communication with liquid conduit 172 and extends within the internal volume of liquid reservoir 152 to draw liquid 200 from the bottom of, or the lower end region of, liquid reservoir 152. In some examples, liquid delivery system 150 further includes a check valve that is configured to prevent liquid 200 from flowing back into liquid reservoir 152 from pump 154 or from the liquid conduit 172 that interconnects liquid reservoir 152 and pump 154. When included, the check valve may be positioned within, associated with, or define a portion of cap 176, sip tube 174, and/or the liquid conduit 172 that interconnects liquid reservoir 152 and pump 154.

As mentioned, in some examples, liquid applicators 100 are configured to apply liquid 200 to a substrate 300 that is vertical, angled, curved and/or inverted. With this in mind, in some examples, liquid reservoir 152 is configured to confine liquid 200 when liquid applicator 100 is oriented at any suitable angle relative to a direction of gravity.

In some examples, liquid outlet 156 defines at least one unconstricted or non-tapered orifice for flowing liquid 200 to section 222 of applicator fabric 220. In some examples, liquid outlet 156 is positioned in close proximity to section 222 of applicator fabric 220 and/or is positioned within a region of applicator head 104. As shown in FIG. 1, section 222 of applicator fabric 220 defines a front side 236 of applicator fabric 220 that is oriented to directly contact substrate 300, and a rear side 238 of applicator fabric 220 that is opposite of front side 236 of applicator fabric 220. In some examples, liquid outlet 156 is positioned to deliver liquid 200 to rear side 238 of applicator fabric 220. In some examples, liquid delivery system 150 includes a liquid distribution bar 162 that is in communication with pump 154 via liquid conduit 172 and that comprises liquid outlet 156. When included, liquid distribution bar 162 is configured to deliver liquid 200 evenly across the section 222 of applicator fabric 220. More specifically, in some examples, liquid distribution bar 162 is positioned to extend at least substantially parallel to the width of section 222 and includes a plurality of liquid ports 164 distributed along a length of liquid distribution bar 162. Each liquid port 164 is in fluid communication with liquid conduit 172 and the plurality of liquid ports 164 collectively define liquid outlet 156. In some examples, liquid distribution bar 162 is positioned between fabric-contacting members 140 of applicator head 104.

Liquid applicators 100 may be configured to deliver any suitable type of liquid 200 to substrate 300. Generally speaking, the type of liquid 200 that liquid applicators 100 are configured to handle is selected based upon the type of liquid application (e.g., for surface cleaning), for compatibility with the particular substrate 300, and/or various additional liquid application process requirements. Similarly, the components of liquid applicator 100 that contact liquid 200, either directly or indirectly during liquid application, may be formed from materials that are compatible with the liquid 200. For example, the materials that form the various components of liquid delivery system 150 and/or applicator fabric 220 may be selected for compatibility with liquid 200. As examples, when liquid applicator 100 is configured to clean or remove material from substrate 300, liquid 200 may include a cleaning solution, an aqueous solution, a surfactant-containing solution, an organic solvent, an alcohol, an aliphatic hydrocarbon, acetone, and/or combinations thereof. As more examples, when liquid applicators 100 are configured to apply a liquid 200 to substrate 300 that is to remain on the surface thereof at least within an operable timeframe, liquid 200 may include a paint, a resin, an adhesive, and/or a mold-release agent.

In some examples, liquid applicators 100 are configured to handle a plurality of different types of liquids 200 and/or apply a plurality of different types of liquid 200 to substrate 300, such as in sequential liquid application cycles. With this in mind, as shown in FIG. 1, in some examples, liquid applicators 100 include a plurality of liquid delivery systems 150 each being configured to deliver a different type of liquid 200 to substrate 300. In some such examples, liquid applicators 100 comprise a first liquid delivery system 150 configured to handle a cleaning solution and a second liquid delivery system 150 configured to handle a liquid that is to remain on substrate 300 at least within an operable time frame.

As further shown in FIG. 1, in some examples, liquid applicator 100 includes, or is configured to receive power from, one or more power sources 30. Examples of suitable power sources 30 include one or more mechanical power sources, one or more pneumatic power sources, one or more hydraulic power sources, one or more batteries, and/or one or more electrical conduits that supply power from one or more external power sources. Each actuated component of liquid applicators 100 may be connected to and configured to receive power from power source(s) 30. In some examples, controller 10 is configured to regulate the amount of power delivered to each actuated component to control operation thereof. Additionally or alternatively, one or more actuated components of liquid applicators 100 may include an internal controller 16 that is configured to receive higher-level command signals from controller 10 and translate the higher-level command signals received from controller into component-specific commands, such as a change in applied voltage. Examples of actuated components of liquid applicator 100 include any of the components discussed herein that are actuated by controller 10. Examples of actuated components that may include a respective internal controller 16 include pay-out motor 130, take-up motor 132, pinch roller assembly motor 170, and/or pump motor 158.

FIGS. 2-6 provide an illustrative, non-exclusive example of liquid applicators 100 that is indicated at and referred to herein as liquid applicator 400. Where appropriate, the reference numerals from the schematic illustration of FIG. 1 are used to designate corresponding parts of the example liquid applicator 400 of FIGS. 2-5; however, liquid applicator 400 is non-exclusive and does not limit liquid applicators 100 to the illustrated embodiments of FIGS. 2-6. That is, liquid applicators 100 are not limited to the specific embodiment of FIGS. 2-6, and liquid applicators 100 may incorporate any number of the various aspects, configurations, characteristics, properties, variants, options etc. of liquid applicators 100 that are illustrated in and discussed with reference to the schematic representation of FIG. 1 and/or the embodiment of FIGS. 2-6, as well as variations thereof, without requiring the inclusion of all such aspects, configurations, characteristics, properties, variants, options etc. Furthermore, any additional aspects, configurations, characteristics, properties, variants, options, etc. disclosed in connection with the example liquid applicators 400 of FIGS. 2-6 may be utilized with and/or otherwise included in other liquid applicators 100, including liquid applicators 100 according to FIG. 1. For the purpose of brevity, each previously discussed component, part, portion, aspect, region, etc. or variants thereof may not be discussed, illustrated, and/or labeled again with respect to the examples of FIGS. 2-6; however, it is within the scope of the present disclosure that the previously discussed features, variants, etc. may be utilized with the examples of FIGS. 2-6.

Figure 2:
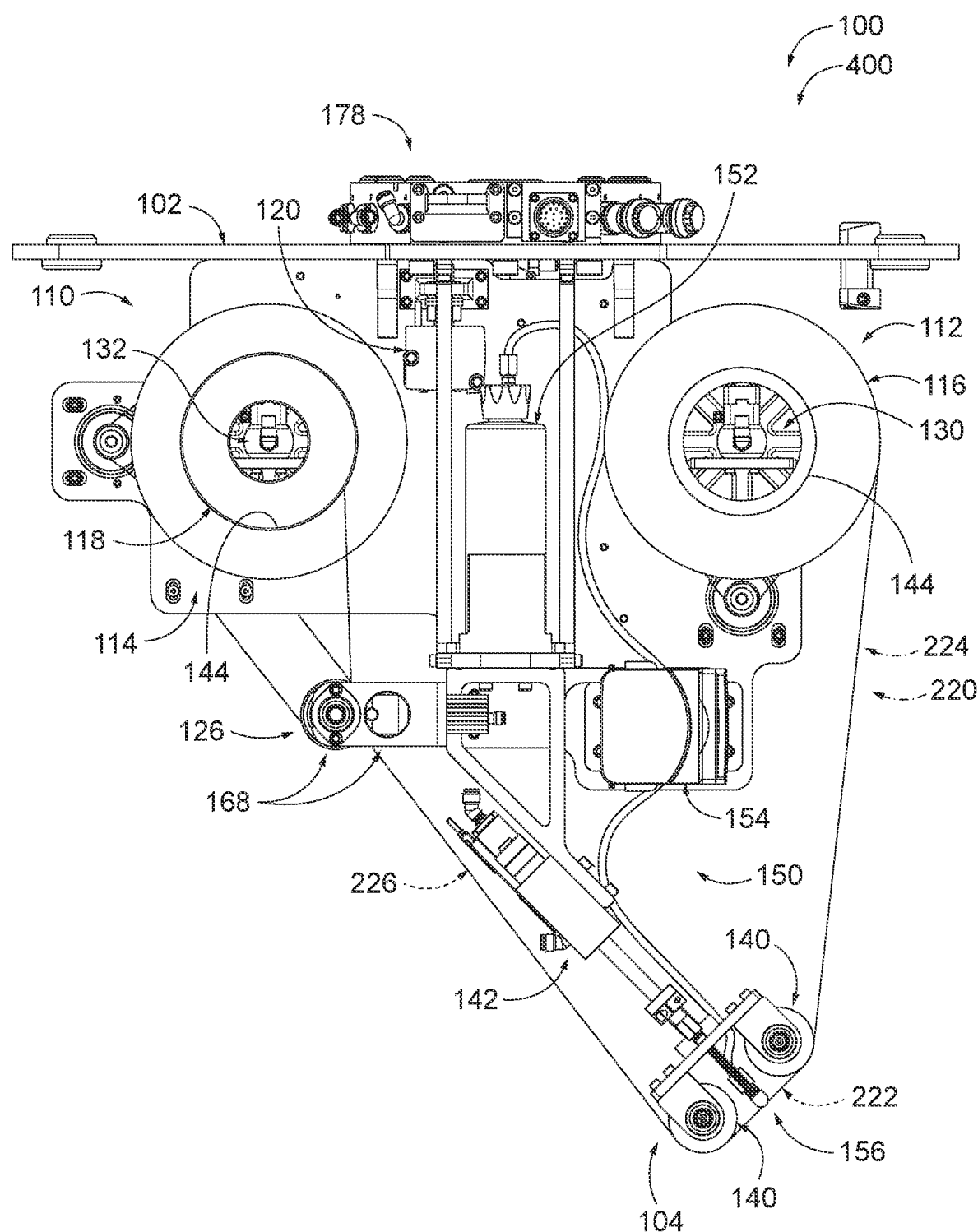
FIG. 2 is a side view illustrating an example liquid applicator according to the present disclosure.
Figure 3:
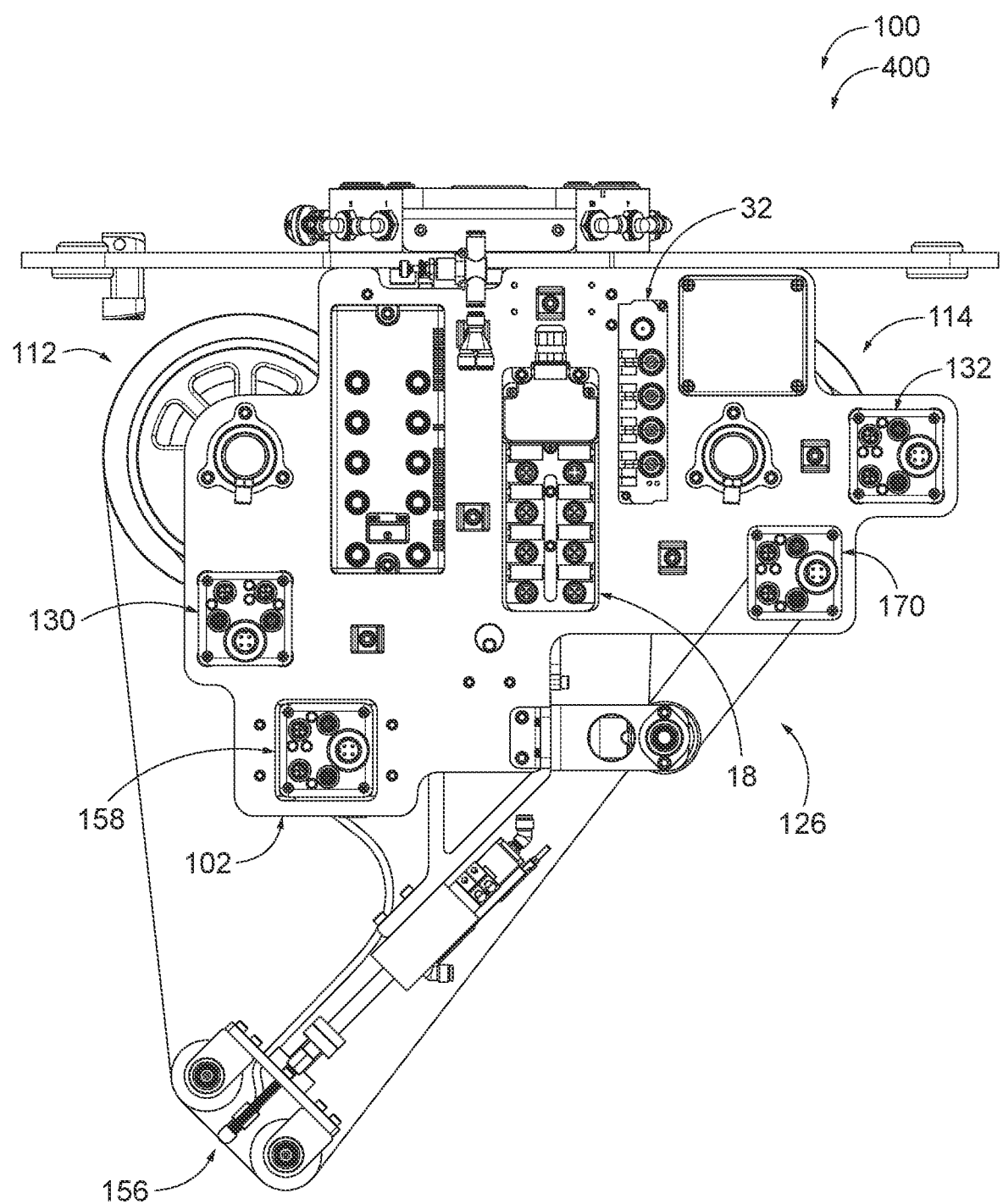
FIG. 3 is another side view of the example liquid applicator of FIG. 2.

With initial reference to FIGS. 2-3, FIG. 2 is a side view of liquid applicator 400, and FIG. 3 is another side view showing the opposite side of liquid applicator 400 to that shown in FIG. 2. As shown in FIGS. 2-3, liquid applicator 400 includes pressure modulator 142 that operatively couples applicator head 104 to frame 102. Liquid applicator 400 also includes a robotic arm coupling mechanism 178 coupled to frame 102 in a position opposite to that of applicator head 104. Robotic arm coupling mechanism 178 is configured to interconnect liquid applicator 400 with a robotic arm 20 and support liquid applicator 400 relative to robotic arm 20. In some examples, robotic arm coupling mechanism 178 is configured to selectively couple to and disconnect liquid applicator 400 from robotic arm 20, such that liquid applicator 400 may be selectively removed from robotic arm 20 for service and/or such that liquid applicator 400 may be selectively utilized as an end effector with a plurality of different robotic arms 20. In some examples, robotic arm coupling mechanism 178 includes one or more power connections configured to supply power from one or more external power sources to liquid applicator 400 and/or one or more digital connections configured to transmit data signals between the various actuated components of liquid applicator 400 and controller 10.

In the examples shown in FIGS. 2-3, liquid applicator 400 is supporting applicator fabric 220 for operable application of liquid 200 to substrate 300. In particular, fabric conveyance system 110 is supporting deployed portion 224 of applicator fabric 220 with section 222 of applicator fabric 220 tensioned across fabric-contacting members 140 of applicator head 104. As shown, supply spool 116 of applicator fabric 220 is supported by fabric pay-out assembly 112. In particular, fabric pay-out assembly 112 comprises pay-out motor 130 that is engaged with, and configured to apply pay-out torque to, a drum 144 that supports supply spool 116. Fabric take-up assembly 114 includes a drum 144 supporting take-up spool 118 formed from applicator fabric 220 received from applicator head 104. Fabric take-up assembly 114 also includes take-up motor 132 engaged with drum 144 and configured to rotate drum 144 to spool up applicator fabric 220 received from applicator head 104. Fabric conveyance system 110 also includes pinch roller assembly 126, which includes rollers 168 engaged with take-up portion 226 of applicator fabric 220 and pinch roller assembly motor 170 configured to selectively rotate rollers 168 to move applicator fabric 220 from supply spool 116, across applicator head 104, and towards take-up spool 118. Fabric conveyance system 110 further includes radius detector 120 configured to detect the pay-out radius 122 of supply spool 116 and generate corresponding detector signals 12 that are received by controller 10. Controller 10 is configured to actuate pay-out motor 130 and take-up motor 132 based on the detector signals 12 received from radius detector 120, such as discussed herein.

Liquid delivery system 150 of liquid applicator 400 includes liquid reservoir 152 for containing liquid 200, pump 154 configured to selectively flow liquid 200, and liquid outlet 156 positioned to apply liquid 200 to section 222 of applicator fabric 220. Liquid delivery system 150 further includes pump motor 158 configured to selectively actuate liquid pump 154 as discussed herein, and liquid conduits 172 that interconnect pump 154 with liquid reservoir 152 and liquid outlet 156.

Fabric pay-out assembly 112, fabric take-up assembly 114, pinch roller assembly 126, and each component of liquid delivery system 150 are operably coupled to and supported by frame 102. As perhaps best seen in FIG. 3, liquid applicator 400 also includes a power distribution unit 32 configured to route power to the actuated components of liquid applicator 400, and a communications unit 18 configured to route the detector signals 12 from radius detector 120 to controller 10, and route command signals 14 from controller 10 to the actuated components of liquid applicator 400. In this example, controller 10 and power sources 30 are external to, or remote from, frame 102 and the components of liquid applicator 400 coupled thereto. Thus, in this example, power distribution unit 32 is configured to receive, and distribute power from, the remote power sources 30, and communications unit 18 is configured to transmit the data signals between the remote controller 10 and the components of liquid applicator 400 that are operably coupled to frame 102.

Figure 4:
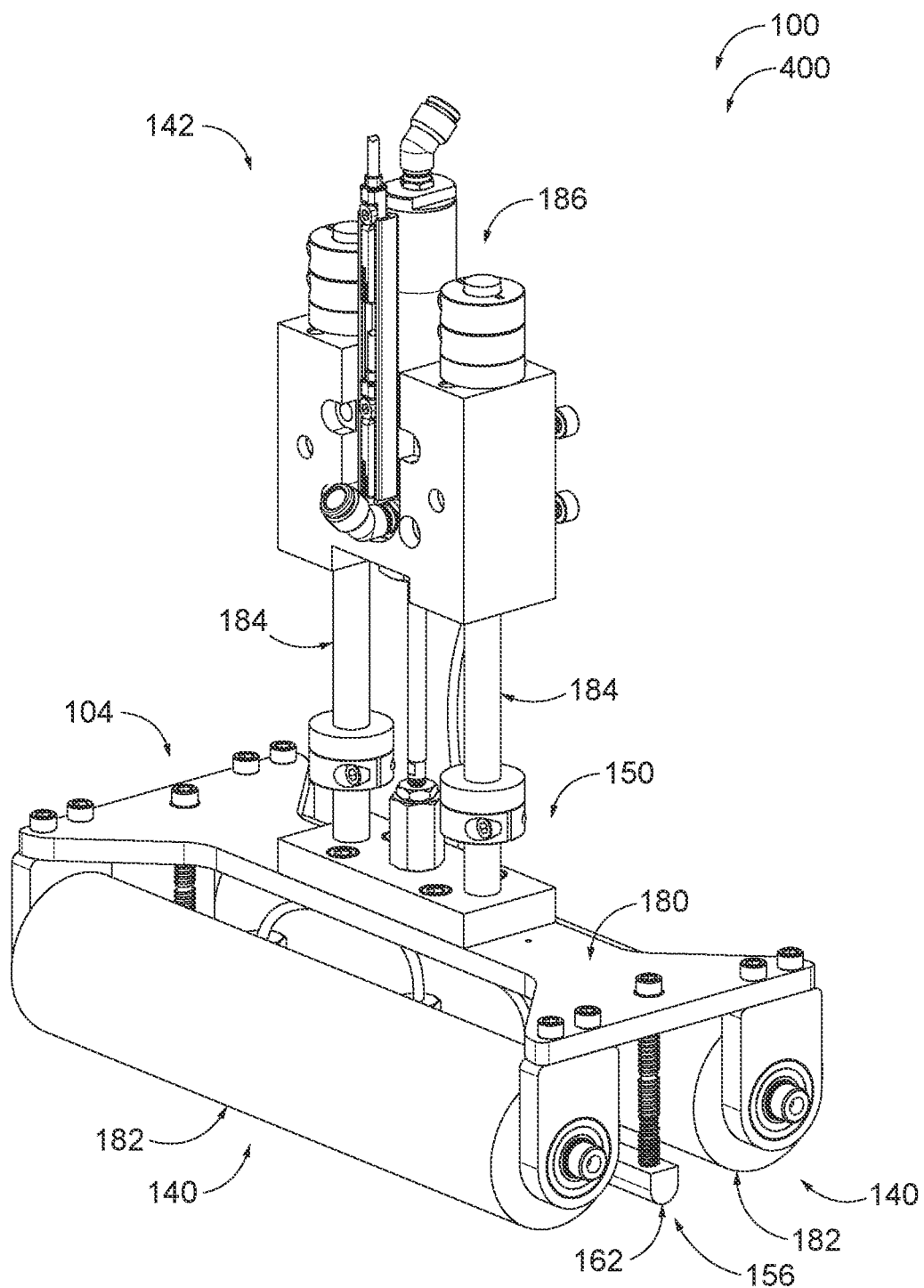
FIG. 4 is a partial isometric view showing a portion of the example liquid applicator of FIG. 2.

FIG. 4 is a partial isometric view of liquid applicator 400 showing applicator head 104, liquid outlet 156, and pressure modulator 142. Applicator fabric 220 is removed from the illustration of FIG. 4 for clarity. As shown in FIG. 4, applicator head 104 includes a chassis 180 operably coupled to pressure modulator 142 and supporting fabric-contacting members 140. In this example, fabric-contacting members 140 include a pair of contact rollers 182 that are rotatably coupled to chassis 180, with chassis 180 supporting contact rollers 182 to extend parallel to and spaced apart from one another. Liquid delivery system 150 includes liquid distribution bar 162, which is operably coupled to chassis 180 to extend parallel to and between fabric-contacting members 140.

Pressure modulator 142 includes a pair of rods 184 that are operably coupled to chassis 180 and received in a pneumatic cylinder assembly 186 that is configured to permit selective displacement of rods 184, together with applicator head 104, relative to frame 102.

Figure 5:
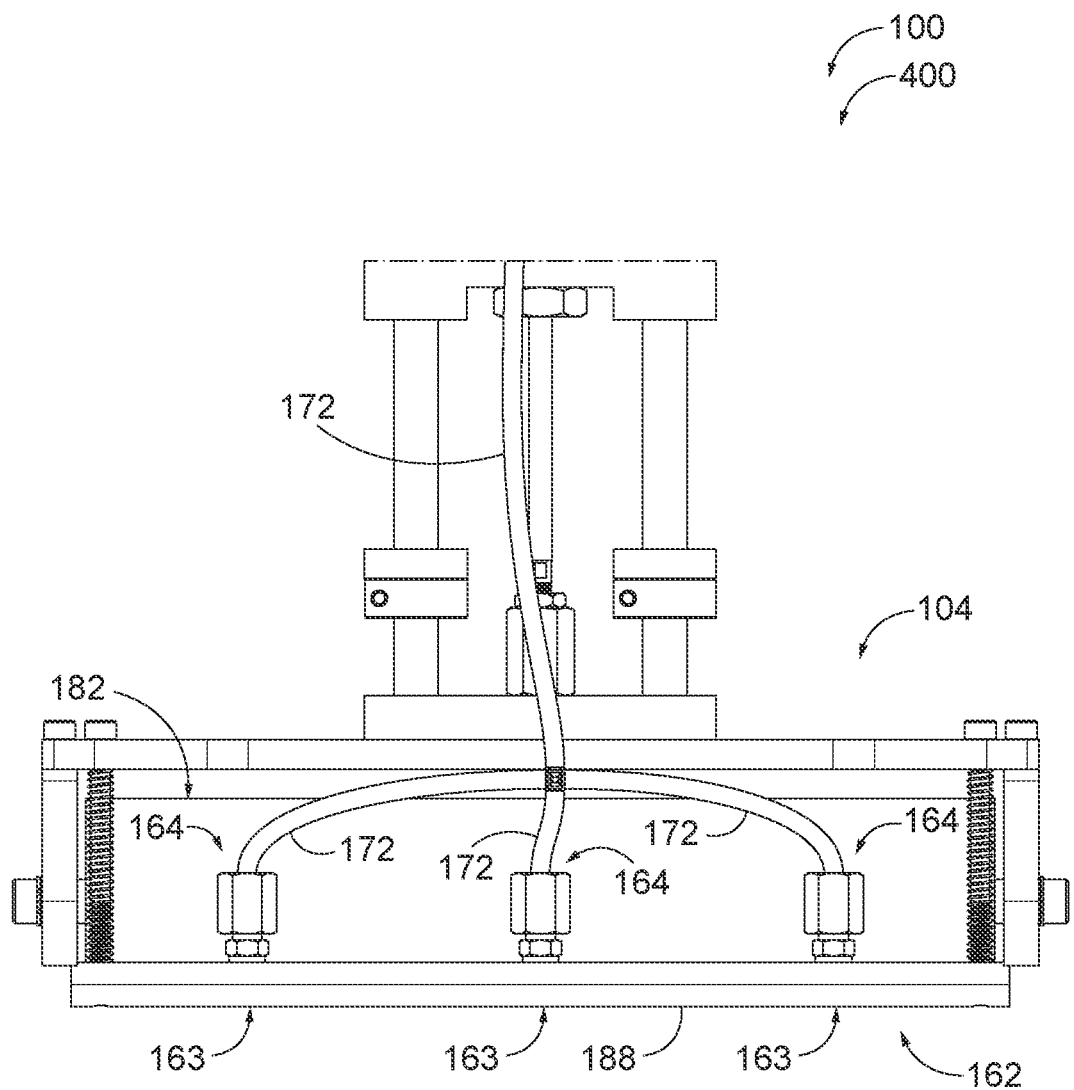
FIG. 5 is a head-on view showing a portion of the example liquid applicator of FIG. 2.

FIG. 5 is a partial frontal view of liquid applicator 400 showing applicator head 104 and liquid distribution bar 162. Applicator fabric 220 and one of the contact rollers 182 are removed from the illustration of FIG. 5 for purposes of clarity. As shown in FIG. 5, liquid distribution bar 162 includes a plurality of liquid ports 164 that are in fluid communication with liquid conduit 172 and configured to supply liquid 200 from liquid conduit 172 to section 222 of applicator fabric 220. In this particular example, each liquid port 164 includes a bore 163 that extends through a base surface 188 of liquid distribution bar 162. Liquid distribution bar 162 is positioned such that base surface 188 is in close proximity to, or contacts, the rear side of section 222 of applicator fabric 220. In this way, each liquid port 164 may deliver liquid 200 directly to the rear side of section 222 of applicator fabric 220.

Figure 6:
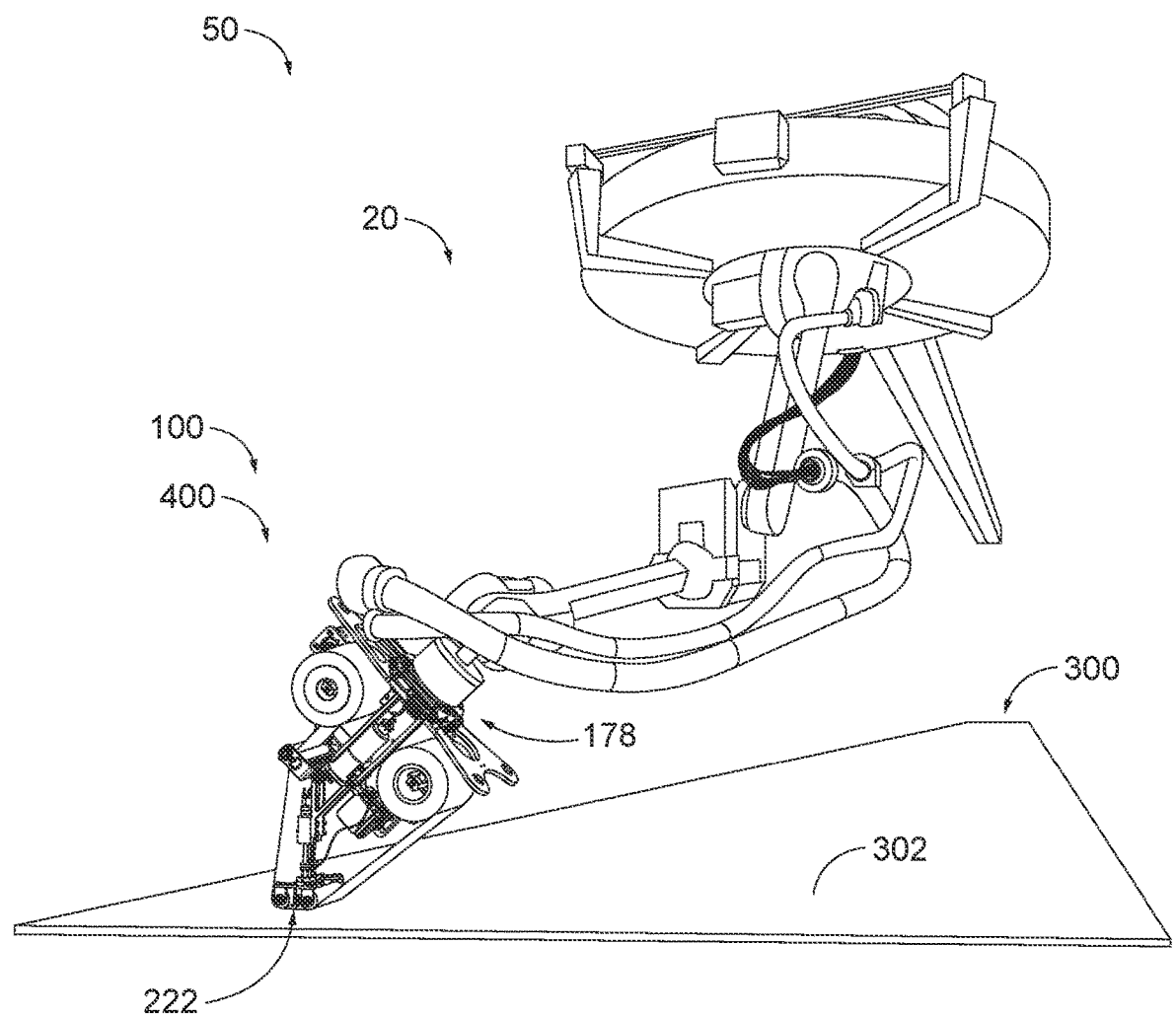
FIG. 6 is an isometric view showing an example automated liquid applicator assembly that includes the example liquid applicator of FIG. 2.

Turning to FIG. 6, illustrated therein is an isometric view of an example automated liquid applicator assembly 50 that includes liquid applicator 400. As shown in FIG. 6, automated liquid applicator assembly 50 includes a robotic arm 20 that is operably coupled to liquid applicator 400 through a robotic arm coupling mechanism 178. In this example, robotic arm 20 is supporting and positioning liquid applicator 400 for operable application of liquid 200 to substrate 300. More specifically, robotic arm 20 is orienting liquid applicator 400 such that section 222 of applicator fabric 220 is parallel to and in contact with the surface 302 of substrate 300. As mentioned and shown in FIG. 6, in some examples, robotic arm 20 is configured to move liquid applicator 400 across substrate 300, such as while maintaining section 222 of applicator fabric 220 in contact with surface 302 of substrate 300. Robotic arm 20 may be configured to move liquid applicator 400 in any suitable manner, such as within at least three degrees of freedom.

Figure 7:
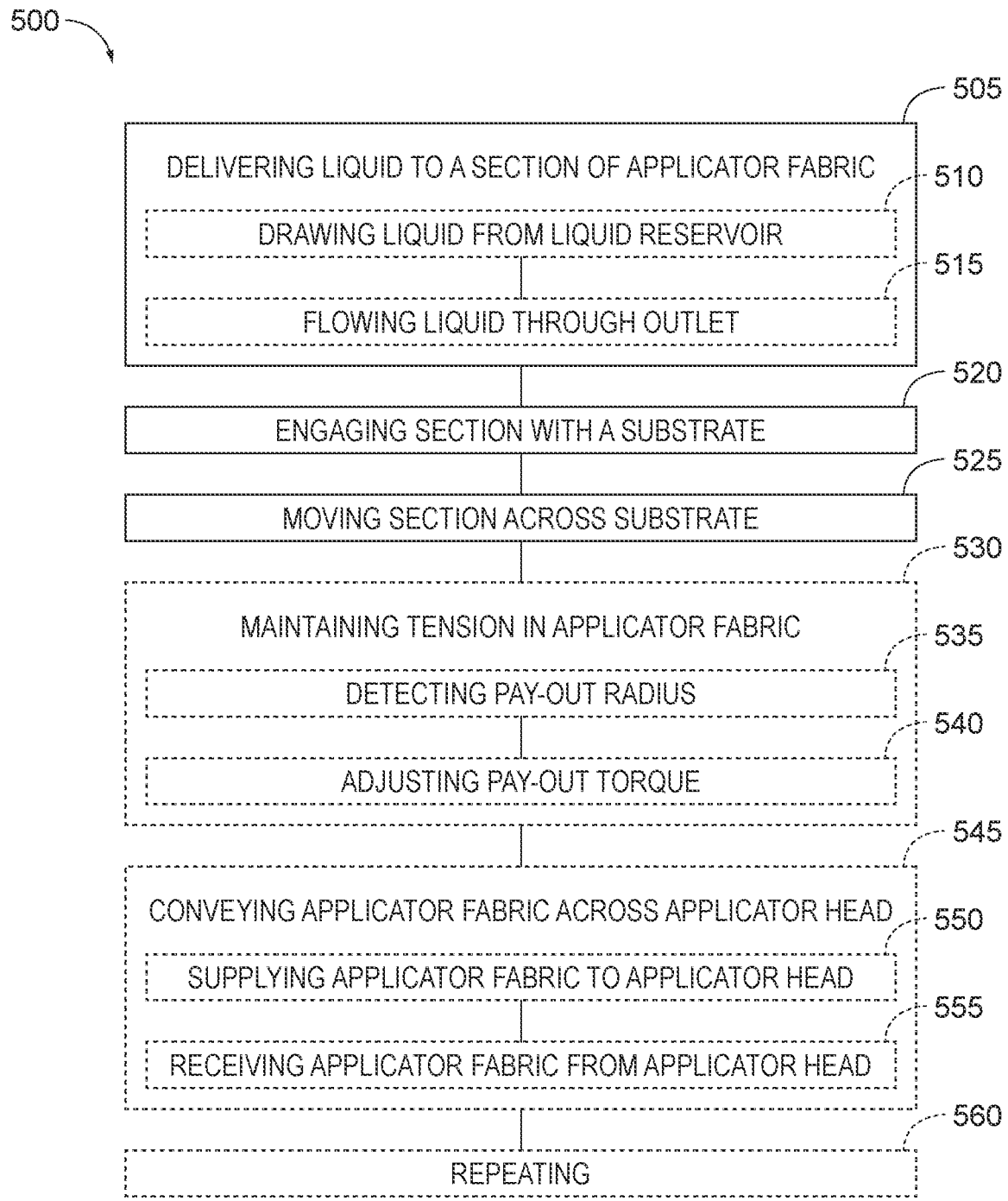
FIG. 7 is a flowchart schematically representing examples of methods according to the present disclosure.

FIG. 7 provides a flowchart that represents illustrative, non-exclusive examples of methods 500 for applying a liquid to a substrate with a liquid applicator according to the present disclosure. In FIG. 7, some steps are illustrated in dashed boxes indicating that such steps may be optional or may correspond to an optional version of methods 500 according to the present disclosure. That said, not all methods 500 according to the present disclosure are required to include each of the steps illustrated in solid boxes. The methods and steps illustrated in FIG. 7 are not limiting, and other methods and steps are within the scope of the present disclosure, including methods having greater than or fewer than the number of steps illustrated, as understood from the discussions herein.

Methods 500 may be performed to apply a liquid 200 to a substrate 300. Methods 500 may be performed utilizing liquid applicator 100, liquid applicator 400, and/or automated liquid applicator assemblies 50 that are illustrated and discussed herein with reference to FIGS. 1-6. In particular, liquid applicators 100, and automated liquid applicator assemblies 50 discussed herein with reference to FIG. 7 and methods 500 may incorporate any of the features, functions, components, etc., as well as variants thereof, as those discussed herein with reference to FIGS. 1-6 without requiring the inclusion of all such features, functions, components, etc. Likewise, liquid applicator 100, liquid applicator 400, and/or automated liquid applicator assemblies 50 discussed herein with reference to FIGS. 1-6 may incorporate any of the features, functions, components, etc., as well as variants thereof, as those discussed herein with reference to FIG. 7 and methods 500 without requiring the inclusion of all such features, functions, components, etc.

In some examples, controller 10, as discussed above, is programmed to perform or otherwise facilitate or implement one or more of the methods and/or steps represented in FIG. 7 and/or discussed herein. In some examples, instructions for performing the various steps and/or methods described herein are stored as computer-readable instructions in non-transitory memory of controller 10. A processor of controller 10 is configured to execute the computer-readable instructions to perform the one or more steps and/or methods represented in FIG. 7.

As shown in FIG. 7, methods 500 include delivering a liquid 200 to a section 222 of an applicator fabric 220 at 505, engaging the section 222 of the applicator fabric 220 with a substrate 300 at 520, and moving the section 222 of the applicator fabric 220 across the substrate 300 at 525. In some examples, the delivering at 505 includes drawing the liquid 200 from a liquid reservoir at 510 and/or flowing the liquid 200 through a liquid outlet at 515. Methods 500 further may include maintaining tension in the applicator fabric 220 at 530, conveying the applicator fabric 220 across an applicator head 104 at 545, and/or repeating at 560. In some examples, the maintaining at 530 includes detecting a pay-out radius of a supply spool 116 of the applicator fabric at 535 and/or adjusting a pay-out torque applied to the supply spool 116 of the applicator fabric 220 at 540. In some examples, the conveying at 545 includes supplying the applicator fabric 220 to the applicator head 104 at 550 and/or receiving the applicator fabric 220 from the applicator head 104 at 555.

The delivering at 505 includes delivering the liquid 200 to the section 222 of applicator fabric 220 that is supported by an applicator head 104 of the liquid applicator 100. The delivering at 505 additionally or alternatively may be referred to as wetting the section 222 of applicator fabric 220. The delivering at 505 includes delivering any suitable liquid 200 to the section of applicator fabric 220, such as any of the example liquids 200 discussed herein. In some examples, the delivering at 505 includes delivering or applying the liquid 200 to a rear side 238 of the section 222 of applicator fabric 220, as discussed herein.

As mentioned, in some examples, the delivering at 505 includes drawing, pulling, or flowing the liquid 200 from a liquid reservoir 152 of the liquid applicator 100 that contains the liquid 200 at 510, such as discussed herein. Additionally or alternatively, in some examples, the delivering at 505 comprises flowing the liquid 200 through a liquid outlet 156 of the liquid applicator 100 that is positioned for operable application of the liquid 200 to the section 222 of applicator fabric at 515, such as discussed herein.

In some examples, the flowing at 515 comprises flowing the liquid 200 at an ambient pressure, such as discussed herein. More specifically, in some examples, the flowing at 515 comprises flowing the liquid 200 to the section 222 of applicator fabric 220 without increasing the pressure of, spraying, atomizing, and/or volatilizing the liquid 200. As discussed herein, in some examples, the liquid applicator 100 includes a liquid distribution bar 162 having a plurality of liquid ports 164 that collectively define the liquid outlet 156. In some such examples, the flowing at 515 comprises flowing the liquid 200 through the plurality of liquid ports 164 to the section 222 of applicator fabric 220. In some examples, the flowing at 515 is performed with the liquid applicator 100 oriented such that the section 222 of applicator fabric 220 extends horizontally or perpendicular relative to the direction of gravity.

In some examples, the drawing at 510 comprises drawing the liquid 200 with a pump 154 of the liquid applicator 100 and the flowing at 515 comprises flowing the liquid 200 with the pump 154 as discussed herein. As discussed herein, in some examples, the pump 154 comprises a rotor 166 that is configured to rotate to draw the liquid 200 from the liquid reservoir 152 and flow the liquid 200 through the liquid outlet 156. In some such examples, the drawing at 510 comprises rotating, with a pump motor 158 of the liquid applicator 100, the rotor 166 to draw the liquid 200 from the liquid reservoir 152 and/or the flowing at 515 comprises rotating, with the pump motor 158, the rotor 166 to flow the liquid 200 through the liquid outlet 156 and to the section 222 of applicator fabric 220. In some such examples, the drawing at 510 and the flowing at 515 are performed at least substantially simultaneously with one another.

In some examples, the delivering at 505 comprises delivering a predetermined volume of the liquid 200 to the section 222 of the applicator fabric 220. In some examples, the predetermined volume of the liquid 200 is selected based upon an amount of liquid 200 that is required to adequately wet and/or saturate the section 222 of applicator fabric 220. In some examples, the drawing at 510 comprises drawing the predetermined volume of liquid 200 from the liquid reservoir 152, and the flowing at 515 comprises flowing the predetermined volume of liquid 200 through the liquid outlet 156. In some such examples, the delivering at 505 comprises rotating, with the pump motor 158, the rotor 166 of the pump 154 through a predetermined degree of rotation to draw the predetermined volume of liquid 200 from the liquid reservoir 152 and flow the predetermined volume of liquid 200 through the liquid outlet 156. As more specific examples, the predetermined degree of rotation may include a portion of a full rotation, such as at least 45 degrees (°), at least 90°, at least 180°, at least 270°, at most 360° and/or any suitable number of full rotations.

The delivering at 505 may be performed with any suitable sequence or timing within methods 500 such as prior to engaging at 520, prior to moving at 525, prior to conveying at 545, and/or prior to, or least substantially simultaneously with, maintaining at 530.

With continued reference to FIG. 7, methods 500 include engaging, with the applicator head 104, the section 222 of applicator fabric 220 with the substrate 300 at 520. In some examples, the engaging at 520 includes positioning the applicator head 104 in operable contact with the substrate 300 via the section 222 of applicator fabric 220. As discussed herein, in some examples, the liquid applicator 100 is operably coupled to a robotic arm 20 that is configured to move the liquid applicator 100 relative to the substrate 300. In some such examples, the engaging at 520 comprises moving the liquid applicator 100 with the robotic arm 20 to place section 222 of applicator fabric 220 supported by applicator head 104 in contact with the substrate 300. In some examples, the engaging at 520 includes aligning the section 222 of applicator fabric 220 with a surface 302 defined by the substrate 300 such that at least a substantial portion of the section 222 of applicator fabric 220 directly contacts the surface 302 defined by the substrate 300. As discussed herein, the surface 302 defined by the substrate 300 may be oriented at any suitable angle relative to the direction of gravity. With this in mind, in some examples, the engaging at 520 comprises orienting the section 222 of applicator fabric 220 to a corresponding angle relative to the direction of gravity.

The engaging at 520 may be performed with any suitable sequence or timing within methods 500, such as subsequent to the delivering at 505, prior to moving at 525, at least substantially simultaneously with maintaining at 530, and/or prior to conveying at 545.

As shown in FIG. 7, methods 500 further include moving the section 222 of applicator fabric 220 across a region of the substrate 300 at 525. The moving at 525 includes delivering the liquid 200 to the region of the substrate 300. Stated differently, the moving at 525 includes transferring at least a portion of the liquid 200 delivered to the section 222 of applicator fabric 220 during the delivering at 505 from the section 222 to the region of the substrate 300. In some examples, the moving at 525 comprises spreading, wiping, and/or distributing the liquid 200 across a surface 302 defined by the substrate 300 with the section 222 of applicator fabric 220. The region of the substrate 300 may include a portion of, or the entirety of, the surface 302 defined by the substrate 300. In some examples, the moving at 525 comprises forming an even, uniform, and/or thin layer of liquid 200 on the region of the substrate 300.

In some examples, the moving at 525 comprises moving the liquid applicator 100 across or relative to the substrate 300 with the robotic arm 20, such as discussed herein. Additionally or alternatively, in some examples, the moving at 525 includes supporting the liquid applicator 100, and correspondingly the section 222 of applicator fabric 220, in a stationary position and moving the substrate 300 relative to the section 222 of applicator fabric 220 such that the section 222 is moved across the region of the substrate 300.

In some examples, the moving at 525 includes removing material from the region of the substrate 300. More specifically, the moving at 525 may include transferring surface material (e.g., liquids and/or particulate) from the region of the substrate 300 to the section 222 of applicator fabric 220, such as by adhering, adsorbing, and/or absorbing the material to the section 222 of applicator fabric 220 and/or by dissolving the material into the liquid 200 contained in the section 222 of applicator fabric 220.

In some examples, the moving at 525 comprises moving the liquid applicator 100 in a predefined motion to move the section 222 of applicator fabric 220 across a corresponding region of the substrate 300. In some examples, the moving at 525 comprises moving the liquid applicator 100 in a linear motion to move the section 222 of applicator fabric 220 across a linear region of the substrate 300. Additionally or alternatively, in some examples, the moving at 525 comprises moving the liquid applicator 100 in a non-linear motion such as an orbital motion, and/or a reciprocating linear motion.

The moving at 525 is performed with any suitable sequence or timing within methods 500, such as subsequent to the delivering at 505, subsequent to the engaging at 520, at least substantially simultaneously with maintaining at 530, and/or prior to conveying at 545.

With continued reference to FIG. 7, in some examples, methods 500 include maintaining tension in a deployed portion 224 of the applicator fabric 220 at 530. In some examples, the maintaining at 530 includes maintaining section tension in the section 222 of the applicator fabric 220 within a target section tension range. More specifically, as discussed herein, in some examples, liquid applicator 100 includes a fabric pay-out assembly 112 configured to supply the applicator fabric 220 to the applicator head 104 from a supply spool 116 of the applicator fabric 220 and a fabric take-up assembly 114 configured to receive the applicator fabric 220 from the applicator head 104 and form a take-up spool 118 therefrom. In some examples, the maintaining at 530 includes applying, with a pay-out torque adjuster 124 of the liquid applicator 100, a pay-out torque to the supply spool 116 to maintain the section tension in the section 222 of applicator fabric 220 within the target section tension range. In some such examples, the maintaining at 530 includes applying, with the pay-out torque adjuster 124, an upstream force to the deployed portion 224 of applicator fabric 220, such as discussed herein.

As discussed herein, in some examples, the liquid applicator 100 includes a pinch roller assembly 126 configured to engage a take-up portion 226 of the applicator fabric 220. In some such examples, the maintaining at 530 includes engaging, with the pinch roller assembly 126, the take-up portion 226 of the applicator fabric 220. More specifically, in some examples, the maintaining section tension in the section 222 of applicator fabric 220 includes applying, with a pinch roller assembly 126 of the liquid applicator 100, a downstream force to the take-up portion 226 of the applicator fabric 220 to balance the upstream force applied to the deployed portion 224 of applicator fabric 220 by the pay-out torque adjuster 124, such as discussed herein. In some examples, the engaging the take-up portion 226 of applicator fabric 220 includes selectively retaining, with the pinch roller assembly 126, the take-up portion of the applicator fabric 220 to restrict movement of the applicator fabric 220 relative to the applicator head 104, such as during the engaging at 520 and/or the moving at 525. Stated differently, in some examples, the maintaining at 530 includes restricting the applicator fabric 220 from moving relative to the applicator head 104 such as in response to forces applied to the section 222 of the applicator fabric 220 during the engaging at 520 and/or the moving at 525.

As shown in FIG. 7, in some examples, the maintaining at 530 includes detecting, with a radius detector 120 of the liquid applicator 100, a pay-out radius 122 of the supply spool 116 at 535, and adjusting, with the pay-out torque adjuster 124, the pay-out torque applied to the supply spool 116 based on the pay-out radius at 540. In some examples, the adjusting at 540 includes decreasing the pay-out torque applied to the supply spool 116 in proportion to the pay-out radius 122. Stated differently, in some examples, the adjusting at 540 includes varying the pay-out torque applied to the supply spool 116 linearly with the pay-out radius 122 of the supply spool 116. Stated yet another way, in some examples, the maintaining at 530 includes utilizing equations (1)-(4) discussed herein to determine, based on the detector signal 12, the amount of pay-out torque to apply to the supply spool 116 to maintain the section tension in the section 222 of applicator fabric 220 within the target section tension range. In some examples, the maintaining at 530 includes maintaining the upstream force applied to the deployed portion 224 of applicator fabric 220 by the pay-out torque adjuster 124 as the pay-out radius 122 of the supply spool 116 decreases.

In some examples, the maintaining at 530 includes maintaining tension within one or more other sections of the deployed portion 224 of applicator fabric 220 within one or more respective target tension ranges. As a more specific example, the maintaining at 530 may include maintaining a take-up tension in a downstream take-up portion 232 of the applicator fabric 220 that extends between the pinch roller assembly 126 and the take-up spool 118 within a target take-up tension range. In some such examples, the maintaining at 530 includes applying, with a take-up torque adjuster 128 of the liquid applicator 100, a take-up torque to the take-up spool 118 of applicator fabric 220 to maintain the take-up tension within the target take-up tension range. In some such examples, the maintaining at 530 includes applying, with the take-up torque adjuster, a downstream force to the downstream take-up portion 232 of applicator fabric 220, such as discussed herein. In some examples, the maintaining the take-up tension in the downstream take-up portion of the applicator fabric is performed without moving or pulling the applicator fabric 220 through the pinch roller assembly 126 with the take-up torque adjuster. In some examples, the maintaining comprises applying a smaller amount of take-up tension to the downstream take-up portion 232 of applicator fabric 220 than the section tension that is applied to the section 222 of the applicator fabric 220.

In some examples, the maintaining at 530 includes adjusting the take-up torque applied to the take-up spool 118 by the take-up torque adjuster 128 based on the pay-out radius 122 determined during the detecting at 535. As discussed herein, the take-up spool 118 receives applicator fabric 220 that is supplied from the supply spool 116. Thus, the length of applicator fabric 220 on the take-up spool 118, and thereby a take-up radius 123 of the take-up spool 118, increases as the length of applicator fabric 220 on the supply spool 116, and thus the pay-out radius 122, decreases. With this in mind, in some examples, the maintaining at 530 includes increasing the take-up torque applied to the take-up spool 118 by the take-up torque adjuster 128 as the pay-out radius 122 decreases. When included, the maintaining at 530 is performed with any suitable sequence or timing within methods 500. As more specific examples, the maintaining at 530 may be performed prior to, or at least substantially simultaneously with, the delivering at 505, the engaging at 520, the moving at 525, and/or conveying at 545.

As shown in FIG. 7, in some examples, methods 500 include conveying the applicator fabric 220 across the applicator head 104 at 545. The conveying at 545 additionally or alternatively may be referred to herein as replenishing the section 222 of applicator fabric 220. More specifically, as discussed herein, in some examples, the section 222 of applicator fabric 220 becomes soiled, and/or inundated with material absorbed from, and/or otherwise transferred from the substrate 300 during the engaging at 520 and the moving at 525. In any case, it may be desirable to utilize a new section during a subsequent liquid application cycle. With this in mind, the conveying at 545 may include removing a soiled section 222 of applicator fabric 220 from the applicator head 104 and providing a new section 222 of applicator fabric 220 to the applicator head 104.

As shown in FIG. 7, in some examples, the conveying at 545 includes supplying the applicator fabric 220 to the applicator head 104 at 550 and/or receiving the applicator fabric 220 from the applicator head at 555. More specifically, the supplying at 550 includes supplying the applicator fabric 220 from the fabric pay-out assembly 112 or from the supply spool 116 thereof. The receiving at 555 includes receiving, with the fabric take-up assembly 114, the applicator fabric 220 from the applicator head 104 and forming the take-up spool 118 of applicator fabric 220 therefrom.

In some examples, the supplying at 550 comprises rotating the supply spool 116. More specifically, in some examples, the supplying at 550 includes rotating the supply spool 116 by conveying the applicator fabric 220 in a downstream direction 228 with the pinch roller assembly 126, such as discussed herein. In some examples, the receiving at 555 comprises rotating the take-up spool 118. More specifically, as discussed herein, in some examples the liquid applicator 100 includes a take-up motor 132 configured to selectively rotate the take-up spool 118. In some such examples, the receiving at 555 comprises rotating the take-up spool 118 with the take-up motor 132 to receive applicator fabric 220 thereon. In some examples, the receiving at 555 includes conveying, with the pinch roller assembly 126, the applicator fabric 220 from the applicator head 104 towards take-up spool 118 or in the downstream direction 228.

In some examples, the conveying at 545 includes conveying a preselected length of applicator fabric 220 across the applicator head 104, such as any of the preselected lengths of applicator fabric 220 discussed herein. In some such examples, the conveying at 545 includes moving, with the pinch roller assembly 126, the preselected length of applicator fabric 220 in the downstream direction 228 to move the preselected length of applicator fabric 220 across the applicator head 104 and/or draw the preselected length of applicator fabric 220 from the supply spool 116. In such examples, the receiving at 555 includes rotating the take-up spool 118 to receive the preselected length of applicator fabric 220 from the pinch roller assembly 126.

When included, the conveying at 545 is performed with any suitable sequence or timing within methods 500, such as subsequent to the delivering at 505, subsequent to the engaging at 520, and/or subsequent to the moving at 525. Additionally or alternatively, the conveying at 545 is performed subsequent to, or at least substantially simultaneously with, the maintaining at 530. Stated differently, in some examples, methods 500 include maintaining tension in the applicator fabric 220 while conveying the applicator fabric 220 across the applicator head 104, such as discussed herein.

As shown in FIG. 7, in some examples, methods 500 include repeating at 560. When included, the repeating at 560 includes repeating any of the one or more steps of methods 500 in any suitable order. The repeating at 560 may include repeating a given step of methods 500 in a similar manner, or an at least substantially similar manner, to that which the given step was previously performed in methods 500. Alternatively, the repeating at 560 may include repeating a given step in a different manner from that which the given step was previously performed in methods 500.

In some examples, the repeating at 560 is performed to apply the liquid 200 across a plurality of regions of the substrate 300, and/or such as to cover the entire substrate 300 with liquid 200 by repeating methods 500 any suitable number of times. In some such examples, the delivering at 505, the engaging at 520, and the moving at 525 are performed to apply liquid 200 to a first region of the substrate 300, the conveying at 545 comprises replenishing the section 222 of applicator fabric 220 subsequent the engaging at 520 and the moving at 525, and the repeating at 560 includes repeating the delivering at 505, the engaging at 520, and the moving at 525, to apply the liquid 200 to a second region of the substrate 300. For some examples in which methods 500 include applying the liquid 200 to a third region of the substrate 300, the repeating at 560 further includes repeating the conveying at 545 to replenish the section 222 of applicator fabric 220 after the liquid 200 is applied to the second region of the substrate 300.

Additionally or alternatively, in some examples, methods 500 include applying liquid 200 to a plurality of different substrates 300. In some such examples, methods include performing the delivering at 505, the engaging at 520, and the moving at 525 to apply the liquid 200 to a first substrate 300, and optionally subsequently performing the conveying at 545 to replenish the section 222 of applicator fabric 220, and the repeating at 560 includes repeating the delivering at 505, the engaging at 520, and the moving at 525 to apply the liquid 200 to a second substrate 300. The repeating at 560 also may be performed any suitable number of times to apply liquid 200 to any suitable number of regions of the substrate 300 and/or to any suitable number of substrates 300.

In some examples, the delivering at 505, the engaging at 520, and the moving at 525 are performed to apply a first liquid 200 to the substrate 300 and the repeating at 560 includes applying a second liquid 200 to the substrate 300 that is different from the first liquid 200. As a more specific example, the delivering at 505, the engaging at 520, and the moving at 525 may be performed to clean, or remove the mold release agent from, the substrate 300, and the repeating at 560 may be performed to apply a second liquid 200 to the substrate 300, such as a mold release agent, a paint, a resin, and/or an adhesive. As discussed herein, in some examples, liquid applicators 100 include a plurality of liquid delivery systems 150, each including, and being configured to deliver, a different liquid 200 to the section 222 of applicator fabric 220. In some such examples, the delivering at 505 includes delivering a first liquid 200 from the first liquid delivery system 150, and then during the repeating at 560, the delivering at 505 includes delivering a second liquid 200 from a second liquid delivery system 150.

Illustrative, non-exclusive examples of inventive subject matter according to the present disclosure are described in the following enumerated paragraphs:

A. A liquid applicator (100) configured to apply a liquid (200) to a substrate (300) via an applicator fabric (220), the liquid applicator (100), comprising:

a frame (102);

an applicator head (104) operably coupled to the frame (102) and configured to support a section (222) of the applicator fabric (220) for operable application of the liquid (200) to the substrate (300);

a fabric conveyance system (110) operably coupled to the frame (102) and configured to selectively move the applicator fabric (220) across the applicator head (104), wherein the fabric conveyance system (110) comprises a fabric pay-out assembly (112) configured to supply the applicator fabric (220) to the applicator head (104) and a fabric take-up assembly (114) configured to receive the applicator fabric (220) from the applicator head (104); and a liquid delivery system (150) configured to selectively deliver the liquid (200) to the section (222) of the applicator fabric (220).

A1. The liquid applicator (100) of paragraph A, wherein the applicator head (104) comprises a pair of fabric-contacting members (140) each being configured to directly contact and support the section (222) of the applicator fabric (220).

A1.1. The liquid applicator (100) of paragraph A1, wherein the pair of fabric-contacting members (140) extend at least substantially parallel to and laterally spaced apart from one another, and wherein the pair of fabric-contacting members (140) are oriented such that a length of each fabric-contacting member (140) is at least substantially parallel to a width of the section (222) of the applicator fabric (220).

A1.2. The liquid applicator (100) of any of paragraphs A1-A1.1, wherein the fabric conveyance system (110) is configured to tension the section (222) of applicator fabric (220) across the pair of fabric-contacting members (140) such that the section (222) of applicator fabric (220) forms a sheet for operable application of the liquid (200) to the substrate (300).

A1.3. The liquid applicator (100) of any of paragraphs A1-A1.2, wherein each fabric-contacting member (140) of the pair of fabric-contacting members (140) includes a roller (168) or an elongate bladder.

A2. The liquid applicator (100) of any of paragraphs A-A1.3, wherein the applicator head (104) is configured to engage the section (222) of the applicator fabric (220) with the substrate (300), and wherein the liquid applicator (100) further comprises a pressure modulator (142) that operably couples the applicator head (104) to the frame (102) and that positions the applicator head (104) relative to the frame (102), wherein the pressure modulator (142) is configured to maintain a pressure between the applicator head (104) and the substrate (300) within a target pressure range when the applicator head (104) engages the section (222) of the applicator fabric (220) with the substrate (300).

A3. The liquid applicator (100) of any of paragraphs A-A2, wherein the liquid applicator (100) is configured as an end effector of an automated liquid applicator assembly (50) that is configured to selectively apply the liquid (200) to the substrate (300).

A3.1. The liquid applicator (100) of paragraph A3, wherein the automated liquid applicator assembly (50) comprises a robotic arm (20) configured to move the liquid applicator (100) relative to the substrate (300), and wherein the liquid applicator (100) is configured to be operatively coupled the robotic arm (20).

B. The liquid applicator (100) of any of paragraphs A-A3.1, wherein the fabric pay-out assembly (112) is configured to support a supply spool (116) of the applicator fabric (220) and deliver the applicator fabric (220) from the supply spool (116) to the applicator head (104), wherein the fabric take-up assembly (114) is configured to form a take-up spool (118) of the applicator fabric (220) received from the applicator head (104) and support the take-up spool (118), wherein the fabric conveyance system (110) further comprises:
  a radius detector (120) configured to detect a pay-out radius (122) of the supply spool (116) of the applicator fabric (220); and
  a pay-out torque adjuster (124) configured to apply a pay-out torque to the supply spool (116); and
  wherein the liquid applicator (100) further comprises a controller (10) configured to receive, from the radius detector (120), a detector signal (12) respective to the pay-out radius (122) and to actuate the pay-out torque adjuster (124) based on the detector signal (12) to maintain a section tension in the section (222) of the applicator fabric (220) within a target section tension range.

B1. The liquid applicator (100) of paragraph B, wherein a deployed portion (224) of the applicator fabric (220) extends from the supply spool (116) across the applicator head (104) and to the take-up spool (118) wherein the fabric conveyance system (110) is configured to selectively move the applicator fabric (220) in a downstream direction (228), wherein the downstream direction (228) extends along the deployed portion (224) of the applicator fabric (220) from the supply spool (116) towards the take-up spool (118), wherein the pay-out torque adjuster (124) is configured to apply the pay-out torque to the supply spool (116) of applicator fabric (220) in a direction that applies an upstream force to the deployed portion (224) of the applicator fabric (220), and wherein the upstream force is in an upstream direction (230) that is opposed the downstream direction (228).

B2. The liquid applicator (100) of any of paragraphs B-B1, wherein the controller (10) is configured to selectively vary the pay-out torque applied to the supply spool (116) of applicator fabric (220) by the pay-out torque adjuster (124) in proportion to the pay-out radius (122).

B3. The liquid applicator (100) of any of paragraphs B-B2, wherein a/the deployed portion (224) of the applicator fabric (220) includes a take-up portion (226) that extends between the applicator head (104) and the take-up spool (118), and wherein the fabric conveyance system (110) further comprises a pinch roller assembly (126) configured to engage the take-up portion (226) of the applicator fabric (220) and selectively convey the take-up portion (226) of the applicator fabric (220) towards the take-up spool (118).

B3.1. The liquid applicator (100) of paragraph B3, wherein the controller (10) is configured to actuate the pinch roller assembly (126) to selectively retain the take-up portion (226) of the applicator fabric (220) against movement in an/the upstream direction (230) and maintain the section tension in the section (222) of the applicator fabric (220) within the target section tension range when the pay-out torque adjuster (124) applies a/the upstream force to the deployed portion (224) of the applicator fabric (220).

B4. The liquid applicator (100) of any of paragraphs B-B3.1, wherein a/the deployed portion (224) of the applicator fabric (220) includes a downstream take-up portion (232) that extends between a/the pinch roller assembly (126) and the take-up spool (118), wherein the fabric conveyance system (110) further comprises a take-up torque adjuster (128) configured to apply a take-up torque to the take-up spool (118) of applicator fabric (220), and wherein the controller (10) is configured to actuate the take-up torque adjuster (128) based on the detector signal (12) to maintain a take-up tension in the downstream take-up portion (232) of the applicator fabric (220) within a target take-up tension range.

B4.1. The liquid applicator (100) of paragraph B4, wherein the target take-up tension range is different from the target section tension range.

B4.2. The liquid applicator (100) of any of paragraphs B4-B4.1, wherein the take-up torque adjuster (128) is configured to apply the take-up torque to the take-up spool (118) of the applicator fabric (220) in a direction that applies a/the downstream force to the downstream take-up portion (232) of the applicator fabric (220).

B4.3. The liquid applicator (100) of any of paragraphs B4-B4.2, wherein the controller (10) is configured to actuate the take-up torque adjuster (128) to increase the take-up torque applied to the take-up spool (118) as the pay-out radius (122) of the supply spool (116) decreases.

B5. The liquid applicator (100) of any of paragraphs B-B4.3, wherein a/the pinch roller assembly (126) is configured to selectively move a preselected length of the applicator fabric (220) across the applicator head (104) in the downstream direction (228) during an applicator fabric regeneration cycle.

B5.1. The liquid applicator (100) of paragraph B5, wherein the fabric pay-out assembly (112) further comprises a pay-out motor (130) configured to selectively permit rotation of the supply spool (116) during the applicator fabric regeneration cycle.

B5.1.1. The liquid applicator (100) of any of paragraph B5.1, wherein the pay-out motor (130) comprises the pay-out torque adjuster (124), and wherein the controller (10) is configured to actuate the pay-out motor (130) to maintain the section tension in the section (222) of the applicator fabric (220) within the target section tension range during the applicator fabric regeneration cycle.

B5.2. The liquid applicator (100) of any of paragraphs B5-B5.1.1, wherein the fabric take-up assembly (114) further comprises a take-up motor (132) configured to selectively rotate the take-up spool (118) to receive the applicator fabric (220) from the pinch roller assembly (126) and wherein the controller (10) is configured to actuate the take-up motor (132) to rotate the take-up spool (118) during the applicator fabric regeneration cycle.

B5.2.1. The liquid applicator (100) of paragraph B5.2, when depending from paragraph B4, wherein the take-up motor (132) comprises the take-up torque adjuster (128).

C. The liquid applicator (100) of any of paragraphs A-B5.2.1, wherein the liquid delivery system (150) comprises:
 a liquid outlet (156) positioned to supply the liquid (200) directly to the section (222) of the applicator fabric (220);
 a liquid reservoir (152) configured to contain the liquid (200); and
 a pump (154) in fluid communication with the liquid outlet (156) and the liquid reservoir (152) and configured to selectively draw the liquid (200) from the liquid reservoir (152) and selectively flow the liquid (200) through the liquid outlet (156) at an ambient pressure.

C1. The liquid applicator (100) of paragraph C, wherein the pump (154) is configured to flow a preselected volume of the liquid (200) through the liquid outlet (156).

C1.1. The liquid applicator (100) of paragraph C1, further comprising a pump motor (158) configured to actuate the pump (154) and a/the controller (10), and wherein the controller (10) is configured to selectively actuate the pump motor (158) such that the pump (154) flows the preselected volume of the liquid (200) through the liquid outlet (156).

C1.1.1. The liquid applicator (100) of paragraph C1.1, wherein the pump (154) comprises a rotor (166) configured to rotate to draw the liquid (200) from the liquid reservoir (152) and selectively flow the liquid (200) through the liquid outlet (156), wherein the pump motor (158) is configured to selectively rotate the rotor (166), and wherein the controller (10) is configured to actuate the pump motor (158) to rotate the rotor (166) through a preselected degree of rotation corresponding to the preselected volume of the liquid (200) such that pump (154) flows the preselected volume of liquid (200) through liquid outlet (156).

C1.1.2. The liquid applicator (100) of any of paragraphs C1-C1.1.1, wherein the pump motor (158) is a servomotor.

C1.1.3. The liquid applicator (100) of any of paragraphs C1-C1.1.2, wherein the pump (154) is a peristaltic pump.

C2. The liquid applicator (100) of any of paragraph C-C1.1.3, wherein the liquid reservoir (152) is configured to contain the liquid (200) at an ambient pressure or a negative pressure.

C3. The liquid applicator (100) of any of paragraphs C-C2, wherein the liquid reservoir (152) comprises a one-way valve (160) configured to permit air to enter the liquid reservoir (152) and prevent fluid vapor from escaping the liquid reservoir (152).

C4. The liquid applicator (100) of any of paragraphs C-C3, wherein the liquid delivery system (150) further comprises a liquid distribution bar (162) in fluid communication with the pump (154) and comprising the liquid outlet (156), wherein the liquid distribution bar (162) is configured to distribute the liquid (200) evenly across the section (222) of the applicator fabric (220).

C4.1. The liquid applicator (100) of paragraph C4, wherein the liquid distribution bar (162) is operably coupled to the applicator head (104) and oriented to extend at least substantially parallel to a width of the section (222) of the applicator fabric (220), and wherein the liquid distribution bar (162) includes a plurality of liquid ports (164) distributed along a length of the liquid distribution bar (162) and collectively defining the liquid outlet (156).

C4.2. The liquid applicator (100) any of paragraphs C4-C4.1, when depending from paragraph A1, wherein the liquid distribution bar (162) is positioned between the fabric-contacting members (140) of the applicator head (104).

C5. The liquid applicator (100) of any of paragraphs A-C4.2, wherein the controller (10) comprises:
 a non-transitory memory comprising computer readable instructions for executing the method (500) of any of paragraphs D-D4; and
 a processor for executing the computer readable instructions to perform the method (500) of any of paragraphs D-D4.

D. A method (500) of applying a liquid (200) to a substrate (300) with a liquid applicator (100), the method (500) comprising:
 delivering (505) the liquid (200) to a section (222) of an applicator fabric (220) that is supported by an applicator head (104) of the liquid applicator (100);
 engaging (520), with the applicator head (104), the section (222) of the applicator fabric (220) with the substrate (300); and
 moving (525) the section (222) of the applicator fabric (220) across a region of the substrate (300) to deliver the liquid (200) thereto.

D1. The method (500) of paragraph D, wherein the liquid applicator (100) comprises a fabric pay-out assembly (112) configured to supply the applicator fabric (220) to the applicator head (104) from a supply spool (116) of the applicator fabric (220) and a fabric take-up assembly (114) configured to receive the applicator fabric (220) from the applicator head (104) and form a take-up spool (118) therefrom, wherein the method (500) further comprises:
 maintaining (530) section tension in the section (222) of the applicator fabric (220) within a target section tension range, wherein the maintaining (530) comprises:
  detecting (535), with a radius detector (120), a pay-out radius (122) of the supply spool (116); and
  adjusting (540), with a pay-out torque adjuster (124), a pay-out torque applied to the supply spool (116) based on the pay-out radius (122).

D1.1. The method (500) of paragraph D1, wherein the adjusting (540) comprises decreasing the pay-out torque applied to the supply spool (116) in proportion to the pay-out radius (122).

D1.2. The method (500) of any of paragraphs D1-D1.1, wherein the maintaining (530) further comprises adjusting a take-up torque applied to the take-up spool (118) based on the pay-out radius (122).

D1.2.1. The method (500) of paragraph D1.2, wherein the adjusting (540) comprises increasing the take-up torque applied to the take-up spool (118) as the pay-out radius (122) decreases.

D1.3. The method (500) of any of paragraphs D1-D1.2.1, wherein a deployed portion (224) of the applicator fabric (220) extends between the supply spool (116), across the applicator head (104), and to the take-up spool (118), wherein the deployed portion (224) of the applicator fabric (220) includes a take-up portion (226) that extends between the applicator head (104) and the take-up spool (118), wherein the fabric conveyance system (110) further comprises a pinch roller assembly (126) engaged with the take-up portion (226) of the applicator fabric (220), and wherein the maintaining (530) further comprises engaging the take-up portion (226) of the applicator fabric (220) with the pinch roller assembly (126).

D1.3.1. The method (500) of paragraph D1.3, wherein the engaging the take-up portion (226) of the applicator fabric (220) with the pinch roller assembly (126) comprises selectively retaining the take-up portion (226) of the applicator fabric (220) to restrict movement of the applicator fabric (220) during the moving (525).

D2. The method (500) of any of paragraphs D-D1.3.1, further comprising:

conveying (545) the applicator fabric (220) across the applicator head (104), wherein the conveying (545) comprises:
    supplying (550), with a/the fabric pay-out assembly (112), the applicator fabric (220) to the applicator head (104) from a/the supply spool (116) of the applicator fabric (220); and
    receiving (555), with a/the fabric take-up assembly (114), the applicator fabric (220) from the applicator head (104) and forming a/the take-up spool (118) of applicator fabric (220) from the applicator fabric (220) received from the applicator head (104).

D2.1. The method (500) of paragraph D2, wherein the supplying (550) comprises rotating the supply spool (116) and the receiving (555) comprises rotating the take-up spool (118).

D2.1.1. The method (500) of paragraph D2.1, wherein the supplying (550) comprises rotating the supply spool (116) by conveying the applicator fabric (220) in a downstream direction (228) with a/the pinch roller assembly (126).

D2.1.1.1. The method (500) of paragraph D2.1.1, wherein the conveying (545) further comprises moving, with the pinch roller assembly (126), a preselected length of the applicator fabric (220) in the downstream direction (228) to move the preselected length of the applicator fabric (220) across the applicator head (104).

D3. The method (500) of any of paragraphs D-D2.1.1.1, wherein the delivering (505) comprises:
    drawing (510), with a pump (154), the liquid (200) from a liquid reservoir (152); and
    flowing (515), with the pump (154), the liquid (200) through a liquid outlet (156) to the section (222) of the applicator fabric (220) at an ambient pressure.

D3.1. The method (500) of paragraph D3, wherein the drawing (510) comprises drawing a predetermined volume of the liquid (200) from the liquid reservoir (152), and wherein the flowing (515) comprises flowing the predetermined volume of the liquid (200) through the liquid outlet (156).

D3.1.1. The method (500) of paragraph D3.1, wherein the delivering (505) comprises rotating, with a pump motor (158), a rotor (166) of the pump (154) through a predetermined degree of rotation to (i) draw the predetermined volume of the liquid (200) from the liquid reservoir, and (ii) flow the predetermined volume of the liquid (200) through the liquid outlet (156).

D4. The method (500) of any of paragraphs D-D3.1.1, wherein the liquid applicator (100) is the liquid applicator of any of paragraphs A-C5.

E. An automated liquid applicator assembly (50) comprising:
    the liquid applicator (100) of any of paragraphs A-C5; and
    a robotic arm (20) operatively coupled to the frame (102) and configured to (i) move the liquid applicator (100) to place the section (222) of the applicator fabric (220) in contact with the substrate (300) and (ii) move the liquid applicator (100) to move the section (222) of applicator fabric (220) across a portion of the substrate (300) to apply the liquid (200) thereto, wherein the robotic arm (20) is configured to move the liquid applicator (100) in at least three degrees of freedom relative to the substrate (300).

A controller 10 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A liquid applicator configured to apply a liquid to a substrate via an applicator fabric, the liquid applicator comprising:
a frame;
an applicator head operably coupled to the frame and configured to support a section of the applicator fabric for operable application of the liquid to the substrate;
a fabric conveyance system operably coupled to the frame and configured to selectively move the applicator fabric across the applicator head, wherein the fabric conveyance system comprises a fabric pay-out assembly configured to supply the applicator fabric to the applicator head and a fabric take-up assembly configured to receive the applicator fabric from the applicator head; and
a liquid delivery system configured to selectively deliver the liquid to the section of the applicator fabric, wherein the liquid delivery system comprises:
a liquid outlet positioned to supply the liquid directly to the section of the applicator fabric;
a liquid reservoir configured to contain the liquid; and
a pump in fluid communication with the liquid outlet and the liquid reservoir and configured to selectively draw the liquid from the liquid reservoir and selectively flow the liquid through the liquid outlet at an ambient pressure;
wherein the pump comprises a rotor configured to rotate to draw the liquid from the liquid reservoir and selectively flow the liquid through the liquid outlet, wherein a pump motor is configured to selectively rotate the rotor, and wherein the liquid applicator further comprises a controller configured to actuate the pump motor to rotate the rotor through a preselected degree of rotation corresponding to a preselected volume of the liquid such that the pump flows the preselected volume of the liquid through the liquid outlet.

2. The liquid applicator of claim 1, wherein the liquid delivery system further comprises a liquid distribution bar in fluid communication with the pump and configured to distribute the liquid evenly across the section of the applicator fabric, wherein the liquid distribution bar is operably coupled to the applicator head and oriented to extend at least substantially parallel to a width of the section of the applicator fabric, and wherein the liquid distribution bar includes a plurality of liquid ports distributed along a length of the liquid distribution bar and collectively defining the liquid outlet.

3. The liquid applicator of claim 2, wherein the applicator head comprises a pair of fabric-contacting members, each being configured to directly contact and support the section of the applicator fabric, wherein the pair of fabric-contacting members extend at least substantially parallel to and laterally spaced apart from one another, and wherein the liquid distribution bar is positioned between the fabric-contacting members of the applicator head.

4. A liquid applicator configured to apply a liquid to a substrate via an applicator fabric, the liquid applicator comprising:
a frame;
an applicator head operably coupled to the frame and configured to support a section of the applicator fabric for operable application of the liquid to the substrate;
a liquid delivery system configured to selectively deliver the liquid to the section of the applicator fabric;
a fabric conveyance system operably coupled to the frame and configured to selectively move the applicator fabric across the applicator head, wherein the fabric conveyance system comprises:
a fabric pay-out assembly configured to support a supply spool of the applicator fabric and deliver the applicator fabric from the supply spool to the applicator head;
a fabric take-up assembly configured to receive the applicator fabric from the applicator head and to form and support a take-up spool of the applicator fabric received from the applicator head;
a radius detector configured to detect a pay-out radius of the supply spool of the applicator fabric; and
a pay-out torque adjuster configured to apply a pay-out torque to the supply spool; and
wherein the liquid applicator further comprises a controller configured to receive, from the radius detector, a detector signal respective to the pay-out radius and to actuate the pay-out torque adjuster based on the detector signal to maintain a section tension in the section of the applicator fabric within a target section tension range.

5. The liquid applicator of claim 4, wherein a deployed portion of the applicator fabric extends from the supply spool across the applicator head and to the take-up spool, wherein the fabric conveyance system is configured to selectively move the applicator fabric in a downstream direction, wherein the downstream direction extends along the deployed portion of the applicator fabric from the supply spool towards the take-up spool, wherein the pay-out torque adjuster is configured to apply the pay-out torque to the supply spool of the applicator fabric in a direction that applies an upstream force to the deployed portion of the applicator fabric, and wherein the upstream force is in an upstream direction that is opposed the downstream direction.

6. The liquid applicator of claim 5, wherein the controller is configured to selectively vary the pay-out torque applied to the supply spool of the applicator fabric by the pay-out torque adjuster in proportion to the pay-out radius.

7. The liquid applicator of claim 4, wherein a deployed portion of the applicator fabric extends from the supply spool across the applicator head and to the take-up spool, wherein the deployed portion of the applicator fabric includes a take-up portion that extends between the applicator head and the take-up spool, and wherein the fabric conveyance system further comprises a pinch roller assembly configured to engage the take-up portion of the applicator fabric and selectively convey the take-up portion of the applicator fabric towards the take-up spool.

8. The liquid applicator of claim 7, wherein the controller is configured to actuate the pinch roller assembly to selectively retain the take-up portion of the applicator fabric against movement in an upstream direction and maintain the section tension in the section of the applicator fabric within the target section tension range when the pay-out torque adjuster applies an upstream force to the deployed portion of the applicator fabric.

9. The liquid applicator of claim 7, wherein a downstream take-up portion of the applicator fabric extends between the pinch roller assembly and the take-up spool, wherein the fabric conveyance system further comprises a take-up torque adjuster configured to apply a take-up torque to the take-up spool of the applicator fabric, and wherein the controller is configured to actuate the take-up torque adjuster based on the detector signal to maintain a take-up tension in the downstream take-up portion of the applicator fabric within a target take-up tension range.

10. The liquid applicator of claim 9, wherein the target take-up tension range is different from the target section tension range.

11. The liquid applicator of claim 9, wherein the controller is configured actuate the take-up torque adjuster to increase the take-up torque applied to the take-up spool as the pay-out radius of the supply spool decreases.

12. The liquid applicator of claim 4, further comprising a pinch roller assembly configured to engage a take-up portion of the applicator fabric that extends between the applicator head and the take-up spool, wherein the pinch roller assembly further is configured to move a preselected length of the applicator fabric across the applicator head in a downstream direction during an applicator fabric regeneration cycle.

13. The liquid applicator of claim 12, wherein the fabric pay-out assembly further comprises a pay-out motor configured to selectively permit rotation of the supply spool during the applicator fabric regeneration cycle.

14. The liquid applicator of claim 13, wherein the pay-out motor comprises the pay-out torque adjuster, and wherein the controller is configured to actuate the pay-out motor to maintain the section tension in the section of the applicator fabric within the target section tension range during the applicator fabric regeneration cycle.

15. The liquid applicator of claim 12, wherein the fabric take-up assembly further comprises a take-up motor configured to selectively rotate the take-up spool to receive the applicator fabric from the pinch roller assembly and wherein the controller is configured actuate the take-up motor to rotate the take-up spool during the applicator fabric regeneration cycle.

16. The liquid applicator of claim 4, wherein the liquid delivery system comprises:
 a liquid outlet positioned to supply the liquid directly to the section of the applicator fabric;
 a liquid reservoir configured to contain the liquid; and
 a pump in fluid communication with the liquid outlet and the liquid reservoir and configured to selectively draw the liquid from the liquid reservoir and selectively flow the liquid through the liquid outlet at an ambient pressure.

17. A method of using the liquid applicator of claim 1, the method comprising:
 delivering the liquid to the section of the applicator fabric that is supported by the applicator head of the liquid applicator, wherein the delivering comprises:
  drawing, with the pump, the liquid from the liquid reservoir; and
  flowing, with the pump, the liquid through the liquid outlet to the section of the applicator fabric at the ambient pressure;
 engaging, with the applicator head, the section of the applicator fabric with the substrate; and
 moving the section of the applicator fabric across a region of the substrate to deliver the liquid thereto;
 wherein the delivering comprises rotating the rotor of the pump through the preselected degree of rotation to draw the preselected volume of the liquid from the liquid reservoir, and flow the preselected volume of the liquid through the liquid outlet.

18. The method of claim 17, wherein the fabric pay-out assembly is configured to supply the applicator fabric to the applicator head from a supply spool of the applicator fabric, wherein the fabric take-up assembly is configured to receive the applicator fabric from the applicator head and form a take-up spool therefrom, wherein the method further comprises:
 maintaining section tension in the section of the applicator fabric within a target section tension range, wherein the maintaining comprises:
  detecting, with a radius detector, a pay-out radius of the supply spool; and
  adjusting, with a pay-out torque adjuster, a pay-out torque applied to the supply spool based on the pay-out radius.

19. A liquid applicator configured to apply a liquid to a substrate via an applicator fabric, the liquid applicator comprising:
 a frame;
 an applicator head operably coupled to the frame and configured to support a section of the applicator fabric for operable application of the liquid to the substrate;
 a fabric conveyance system operably coupled to the frame and configured to selectively move the applicator fabric across the applicator head, wherein the fabric conveyance system comprises a fabric pay-out assembly configured to supply the applicator fabric to the applicator head and a fabric take-up assembly configured to receive the applicator fabric from the applicator head; and
 a liquid delivery system configured to selectively deliver the liquid to the section of the applicator fabric, wherein the liquid delivery system comprises:
  a liquid outlet positioned to supply the liquid directly to the section of the applicator fabric;
  a liquid reservoir configured to contain the liquid; and
  a pump in fluid communication with the liquid outlet and the liquid reservoir and configured to selectively draw the liquid from the liquid reservoir and selectively flow the liquid through the liquid outlet at an ambient pressure;
 wherein the liquid delivery system further comprises a liquid distribution bar in fluid communication with the pump and configured to distribute the liquid evenly across the section of the applicator fabric, wherein the liquid distribution bar is operably coupled to the applicator head and oriented to extend at least substantially parallel to a width of the section of the applicator fabric, and wherein the liquid distribution bar includes a plurality of liquid ports distributed along a length of the liquid distribution bar and collectively defining the liquid outlet.

20. A method of using a liquid applicator configured to apply a liquid to a substrate via an applicator fabric, the liquid applicator comprising:
 a frame;
 an applicator head operably coupled to the frame and configured to support a section of the applicator fabric for operable application of the liquid to the substrate;
 a fabric conveyance system operably coupled to the frame and configured to selectively move the applicator fabric across the applicator head, wherein the fabric conveyance system comprises a fabric pay-out assembly configured to supply the applicator fabric to the applicator head and a fabric take-up assembly configured to receive the applicator fabric from the applicator head; and
 a liquid delivery system configured to selectively deliver the liquid to the section of the applicator fabric, wherein the liquid delivery system comprises:

a liquid outlet positioned to supply the liquid directly to the section of the applicator fabric;

a liquid reservoir configured to contain the liquid; and a pump in fluid communication with the liquid outlet and the liquid reservoir and configured to selectively draw the liquid from the liquid reservoir and selectively flow the liquid through the liquid outlet at an ambient pressure wherein the method comprises:

delivering the liquid to the section of the applicator fabric that is supported by the applicator head of the liquid applicator, wherein the delivering comprises:
drawing, with the pump, the liquid from the liquid reservoir; and
flowing, with the pump, the liquid through the liquid outlet to the section of the applicator fabric at the ambient pressure;

engaging, with the applicator head, the section of the applicator fabric with the substrate; and moving the section of the applicator fabric across a region of the substrate to deliver the liquid thereto; and wherein the fabric pay-out assembly is configured to supply the applicator fabric to the applicator head from a supply spool of the applicator fabric, wherein the fabric take-up assembly is configured to receive the applicator fabric from the applicator head and form a take-up spool therefrom, wherein the method further comprises:

maintaining section tension in the section of the applicator fabric within a target section tension range, wherein the maintaining comprises:
detecting, with a radius detector, a pay-out radius of the supply spool; and
adjusting, with a pay-out torque adjuster, a pay-out torque applied to the supply spool based on the pay-out radius.

\* \* \* \* \*